United States Patent [19]
Takamoto et al.

[11] Patent Number: 5,211,056
[45] Date of Patent: May 18, 1993

[54] THERMAL TYPE INTAKE AIR FLOW MEASURING INSTRUMENT

[75] Inventors: Yuusuke Takamoto, Hitachi; Junichi Makino; Yutaka Nishimura, both of Katsuta; Tomoji Inui, Tokyo; Seiji Suda, Mito, all of Japan

[73] Assignee: Hitachi, Ltd., Tokyo, Japan

[21] Appl. No.: 816,584

[22] Filed: Jan. 3, 1992

Related U.S. Application Data

[62] Division of Ser. No. 507,508, Apr. 11, 1990, Pat. No. 5,107,812.

[30] Foreign Application Priority Data

Apr. 14, 1989 [JP] Japan ................................. 1-92860

[51] Int. Cl.[5] ......................................... G01M 15/00
[52] U.S. Cl. ................................ 73/118.2; 73/204.18
[58] Field of Search .................... 73/118.2, 204.18; 364/431.12

[56] References Cited

U.S. PATENT DOCUMENTS 4,907,446  3/1990  Inada et al. ........................ 73/118.2

Primary Examiner—Jerry W. Myracle
Attorney, Agent, or Firm—Antonelli, Terry Stout & Kraus

[57] ABSTRACT

Analog circuit of a thermal type intake air flow sensor for detecting a quantity of air drawn into an automotive engine is formed as a part of the input hardware of a microcomputer for control of the engine, and the analog circuit is used for operations which need to be performed at high speed, while adjustment, an output process, etc. are executed under the same operating system as is used for engine control.

7 Claims, 21 Drawing Sheets

THERMAL TYPE INTAKE AIR FLOW MEASURING INSTRUMENT

This application is a division of our U.S. application Ser. No. 507,508, filed Apr. 11, 1990, now U.S. Pat. No. 5,107,812, issued Apr. 28, 1992.

BACKGROUND OF THE INVENTION

This invention relates to an internal combustion engine control apparatus incorporating a thermal type intake air flow measuring instrument, and more particularly to a combination of a driver circuit of a thermal type intake air flow measuring instrument and a control circuit of an internal combustion engine control apparatus.

Among well-known intake air flow measuring instruments for internal combustion engines (hereafter briefly referred to as air flow sensors), there is an apparatus for detecting an air flow rate, which uses a heat-generating resistance element and an air temperature-compensating resistance element, both having temperature dependency and being installed in the intake air flow passage of the engine. A feedback circuit controls a current flowing through the heat-generating resistance element to keep the temperature difference between those two resistance elements at a constant value and detects a quantity of electricity corresponding to the current mentioned above so as to determine the air flow rate. The use of a microprocessor to control an internal combustion engine according to a current flowing through a heat-generating resistance element is well known, as this art is revealed in JP-A-61-137017. In the prior art apparatus, the microcomputer for control of the internal combustion engine was completely independent of the driver circuit of the air flow sensor The microcomputer for control of the internal combustion engine controls ignition timing, injection quantity, etc. according to measured quantities, given in signals, such as a number of revolutions N of the internal combustion engine, an air-fuel ratio λ from an O$_2$ sensor, and an air quantity Qa from an air flow sensor. For an ordinary thermal type intake air flow sensor, a heat-generating resistance element and a resistance element for air temperature compensation are provided inside the suction pipe of the internal combustion engine, and a signal processing unit installed near those resistance elements converts signals to specified analog or digital form and supplies the signals to the microcomputer. And, for the sensor, there is provided a current control unit to control a current flowing through the heat-generating resistance element so that a difference in electrical resistance, that is to say, a temperature difference between the heat-generating resistance element and the resistance element for temperature compensation becomes a predetermined value.

Therefore, the conventional air flow detecting apparatus has to transmit detection signals to a microcomputer for control of an internal combustion engine one to two meters away. There is a possibility that noise enters on the signal line in the course of the detection signal transmission. In the area of hardware, the detection apparatus has to be in a large and complicated construction, so that the production cost is high.

SUMMARY OF THE INVENTION

Accordingly, an object of this invention is to provide an apparatus less liable to malfunctioning even if noise enters in the wiring running from the flow sensor to the microcomputer for controlling the internal combustion engine and also an intake air flow measuring apparatus which is compact and less expensive.

In order to achieve the above object, according to the present invention, a driver circuit of a thermal type intake air flow measuring instrument, and a microcomputer for control of an internal combustion engine are arranged on the same insulating board or semiconductor board.

In the arrangement described, the heat-generating resistance element and the resistance element for air temperature compensation are provided inside the suction pipe of the internal combustion engine, while their driver circuits are provided on the same board as the microcomputer for control of the internal combustion engine. Therefore, the wiring distance between the detection apparatus and the microcomputer is short, providing less chances for noise to be mixed in the signals.

DESCRIPTION OF THE PREFERRED EMBODIMENTS

Figure 1:
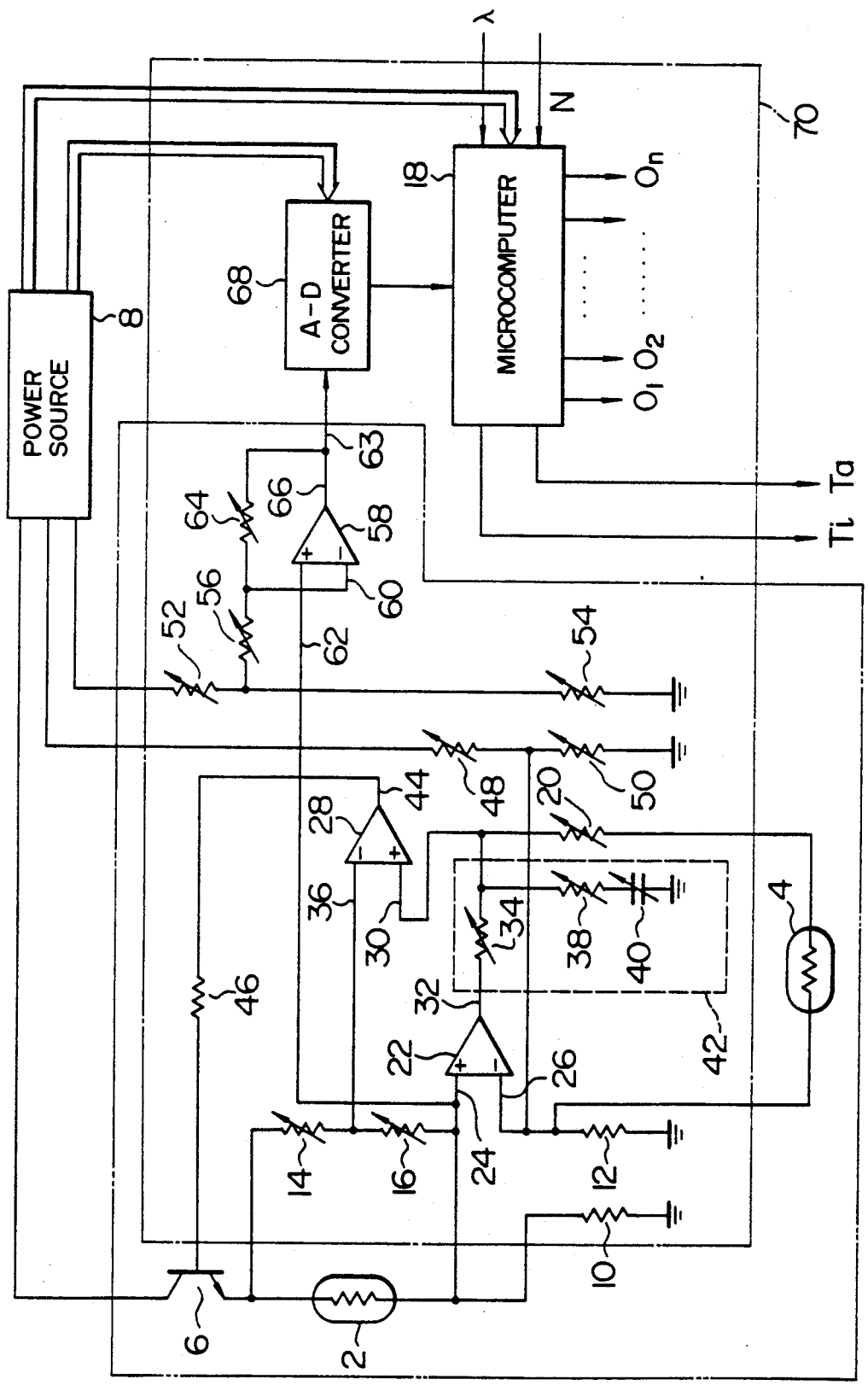
FIG. 1 shows an embodiment of the present invention.

FIG. 1 a circuit arrangement showing an embodiment of the present invention. A heat-generating resistance element 2 and a resistance element 4 for air temperature compensation, disposed in the intake air flow passage of an internal combustion engine, are platinum wires wound around a ceramic bobbin, not shown, and their resistance values change with a rise in temperature. Platinum is a material generally used for a temperature standard, has a linear resistance-temperature characteristic, and is chemically stable. Glass-coated on the surface, the platinum wires are almost equal to the resistance elements 2 and 4 in temperature characteristics. Assuming the resistance values of the resistance elements 2 and 4 is denoted by $R_{20}$ and $R_{40}$, respectively, the temperature coefficient by $\alpha$, the resistance values $R_2$ and $R_4$ of these elements at temperatures $T_2$ and $T_4$ are expressed by the following equations.

$$R_2 = R_{20}(1 + \alpha T_2) \quad (1)$$

$$R_4 = R_{40}(1 + \alpha T_4) \quad (2)$$

where $T_2$: temperature of heat-generating resistance element 2

$T_4$: temperature of resistance element 4 for temperature compensation

The resistance element 2 is connected to a power circuit 8 through the collector-emitter circuit of a transistor 6, and the magnitude of a current flowing through the resistance element 2 is adjusted by controlling the base current of the transistor 6. The resistance elements 2 and 4 are grounded respectively through fixed resistors 10 and 12.

Variable resistance elements 14 and 16 connected in parallel with the resistance element 2 are used to set the temperature of the resistance element 2, and are adjusted by output of a microcomputer 18, which will be described later. The resistance element 4 for air temperature compensation is connected in series with a variable resistor 20. By adjusting the value of this variable resistor 20, the sensitivity of the resistance element 4 for air temperature compensation is adjusted.

Figure 13:
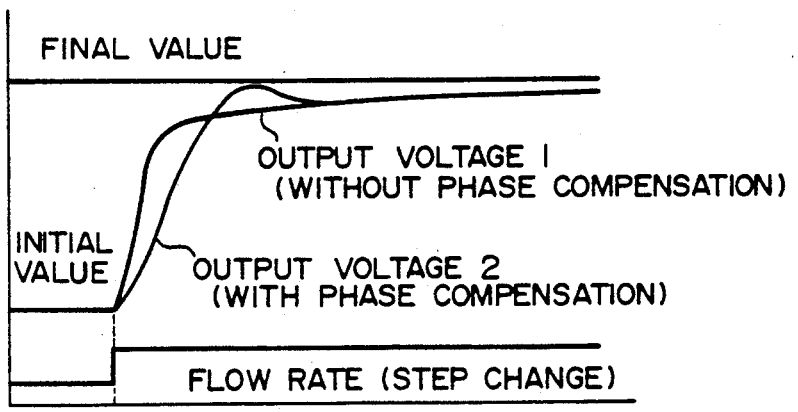
FIG. 13 is a characteristic diagram for explaining phase lag compensation.

The non-inverting input terminal 24 of the amplifier 22 is connected to the connecting point between the resistance element 2 and the fixed resistor 10, while the inverting input terminal 26 is connected to the connecting point between the fixed resistor 12 and the resistance element 4. On the other hand, the non-inverting input terminal 30 of the amplifier 28 is connected to the connecting point between a variable resistance element 34 connected to an output terminal of the amplifier 22 and the variable resistance element 20, while the inverting input terminal 36 is connected to the connecting point between the variable resistance elements 14 and 16. The positive-sequence input terminal 30 is grounded through a variable resistor 38 and a variable capacitor 40, both directly connected to the input terminal 30. The variable resistor 38 and the variable capacitor 40 constitute a phase lag compensating circuit 42 which varies the transient characteristics of the air flow measuring instrument. Actually, the phase lag compensating circuit 42 changes the transient characteristics (step response) of the thermal type air flow sensor as shown in FIG. 13, thereby shortening the time to reach the final value. Therefore, the static characteristic of the flow sensor is prevented from being varied.

An output terminal 44 of the amplifier 28 is connected through a resistor 46 to the base of the transistor 6 to control the base current of the transistor 6 in order to adjust the value of current flowing through the heat-generating resistance element 2 so that the temperature difference between the heat-generating resistance element 2 and the resistance element 4 for air temperature control is constant. The connecting point between two variable resistors 48 and 50 connected in series is connected to the inverting input terminal 26 of the amplifier 22. These resistors 48 and 50 are connected to the power source 8, and by adjusting their resistance values, the response time of the sensor can be adjusted. Variable resistors 52 and 54 connected in series are connected to the power source 8, and the connecting point between the resistors 52 and 54 is connected to inverting input terminal 60 of an amplifier 58 through a variable resistor 56. The non-inverting input terminal 62 of the amplifier 58 is connected to the non-inverting input terminal 24 of the amplifier 22. The inverting input terminal 60 is connected through the variable resistor 64 to an output terminal 66. The variable resistors 52, 54, 56 and 64 are adjusted by outputs $O_l$ to $O_n$ of the microcomputer 18 so that the output characteristics relative to the air flow rate are varied, which will be described later.

An analog signal corresponding to an air flow rate, generated at the output terminal of the amplifier 58 is transmitted through an output line 63 to an A-D converter 68 which converts the analog signal into digital signals, and the digital signals are applied to the microcomputer 18.

A part 70, indicated by an alternate long and short dash line in FIG. 1, is located on a single insulating board, or the component elements of the part 70 are integrated as one body on a single semiconductor board. Therefore, the transistor 6 is arranged in the vicinity of the heat-generating resistance element 2 and the temperature-compensating resistance element 4, grounded in the air suction pipe of the internal combustion engine, or near the part 70. Since the microcomputer 18 is normally one to two meters away from the heat-generating resistance element 2 and the resistance element 4 for air temperature compensation, in the case of the former arrangement, the transistor 6 and the part 70 are connected with a wire, or in the case of the latter arrangement, the resistance elements 2 and 4, and the transistor 6 are connected with a wire. Either way, the quantity of electricity of signals is large, so that the signals are hardly affected by noise.

The microcomputer 18 forms a part of the air flow sensor, and outputs a fuel injection rate signal Ti and an ignition timing signal Ta according to an air flow rate signal Qa, an engine speed signal N of the internal combustion engine, and an air-fuel ratio λ.

With the above arrangement, the sum of the resistance values of the variable resistors 14 and 16 is set at a sufficiently large value compared with the resistance value of the heat-generating resistance element 2. The balanced condition of the circuit at this time is expressed by the following equation.

$$R_{10} \cdot R_4 = K \cdot R_{12} \cdot R_2 \tag{3}$$

where $$K = \frac{R_{16}}{R_{14} + R_{16}} \tag{4}$$

Substitution of the relations of Eqs. (1) and (2) into Eq. (3) gives the following relation.

$$\Delta T = \frac{1}{\alpha} \left[ 1 - k \cdot \frac{R_{12} \cdot R_{20}}{R_{10} \cdot R_{40}} \right] (1 + \alpha T_2) \tag{5}$$

where $R_{10}$: resistance value of resistor 10
$R_{12}$: resistance value of resistor 12
$R_{14}$: resistance value of resistor 14
$R_{16}$: resistance value of resistor 16

From the balance between the generated heat quantity of the heat-generating resistance element and the heat quantity carried away by the air flow, the following equation holds.

$$\begin{aligned} Q &= I^2 R_{20} (1 + \alpha T_2) \\ &= (C_1 + C_2 \sqrt{u}) \Delta T \\ &= \frac{1}{\alpha} (C_1 + C_2 \sqrt{u}) \left[ 1 - k \cdot \frac{R_{12} \cdot R_{20}}{R_{10} \cdot R_{40}} \right] (1 + \alpha T_2) \end{aligned} \tag{6}$$

$$\begin{aligned} I^2 &= \frac{1}{\alpha \cdot R_{20}} (C_1 + C_2 \sqrt{u}) \left[ 1 - k \cdot \frac{R_{12} \cdot R_{20}}{R_{10} \cdot R_{40}} \right] \\ &= K'(C_1 + C_2 \sqrt{u}) \end{aligned} \tag{7}$$

where
I: current flowing through heat-generating resistance element 2
K': constant expressed by the following equation $$K' = \frac{1}{\alpha \cdot R_{20}} \left[ 1 - k \cdot \frac{R_{12} \cdot R_{20}}{R_{10} \cdot R_{40}} \right] \tag{8}$$

In other words, the generated heat quantity is a quadratic function of the square root of flow velocity when the temperature difference $\Delta T$ between the heat-generating resistance element and the ambient temperature is constant. And, the current I flowing through the heat-generating resistance element 2 is a function including the flow velocity u alone. Therefore, the flow velocity can be measured using only the terminal voltage of the resistor 10.

Then, by calculating the ratio of the terminal voltages $V_2$ and $V_4$ of the heat-sensitive resistance elements 2 and 4, we obtain:

$$\frac{V_2}{V_4} = \frac{R_2 \cdot R_{12}}{R_4 \cdot R_{10}} \tag{9}$$

If the resistance elements 2 and 4 are of the same specification, then:

$$\frac{V_2}{V_4} = \frac{R_{12}}{R_{10}} \tag{10}$$

Therefore, if the resistance value $R_{12}$ of the fixed resistor 12 is designed as a sufficiently large value compared with the resistance value $R_{10}$ of the fixed resistor 10, the voltage applied to the resistor 4 can be made sufficiently smaller than the voltage applied to the resistance element 2, so that it is possible to make an accurate heat compensation without self heat generation. The principle of the above-mentioned measurement is revealed in detail in JP-A-55-43447.

Figure 2A:
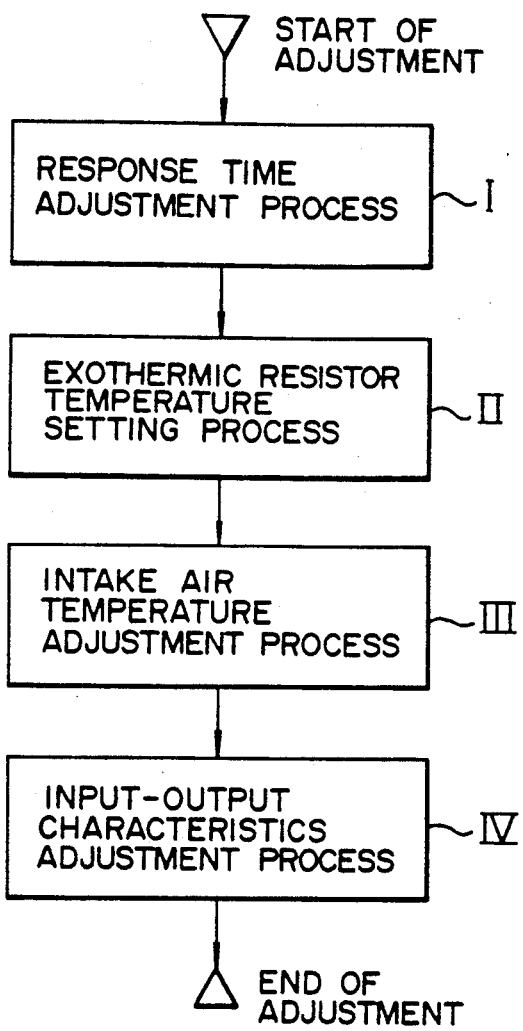
FIGS. 2A and 2D are flowcharts of adjustment.

FIG. 2A shows a flowchart for adjustment of the air flow sensor of FIG. 1. The processes I to IV are executed in this order to determine the resistance values of the variable resistors 14, 16, 34, 38, 20, 48, 50, 56, and 64 of FIG. 1.

Figure 3:
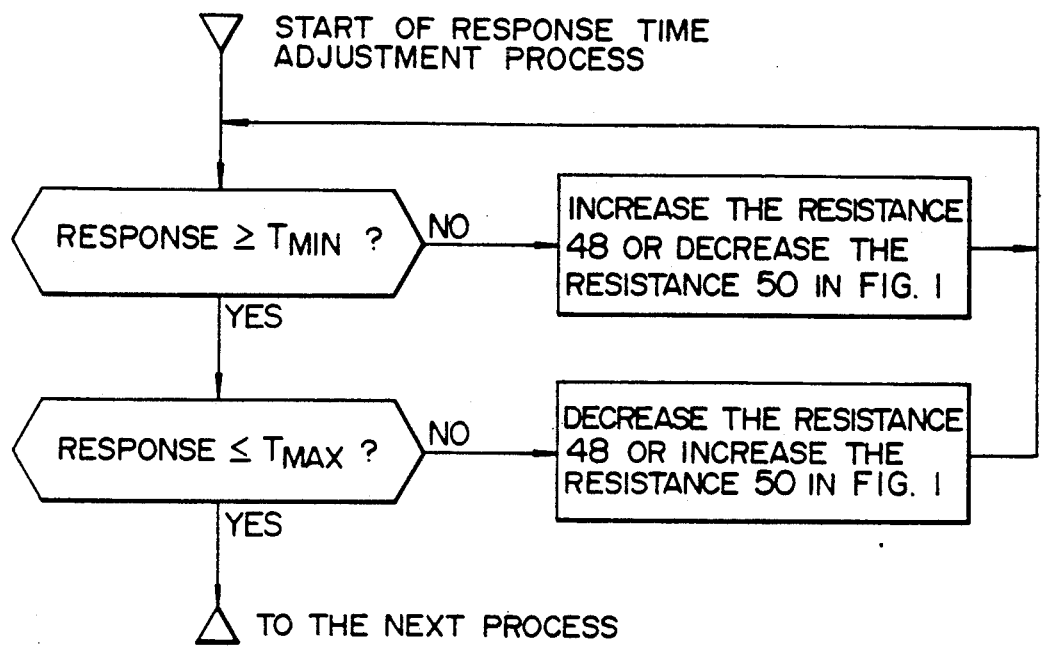
FIG. 3 is a flowchart of a response time adjustment process.

Step I is the process of response time adjustment to determine the values of the resistors 48 and 50 according to the flowchart shown in FIG. 3. Step II is the process of setting the temperature of the heat-generating resistance element 2 in which adjustment is made by varying the values of the resistors 14 and 16. Step III is the intake air temperature adjustment process to vary the value of the resistor 20 to change the sensitivity of the resistance element 4 for intake air temperature detection.

Step IV is the input-output characteristics adjustment process to adjust the analog output characteristics of the air flow sensor relative to the flow rate so that the voltages at the two points of flow rate (about 10 kg/h) and high flow rate (about 200 kg/h) become predetermined values. This process serves to vary the resistance values of the resistors 52, 54, 56, and 64. The data of the resistance values determined by the above-mentioned series of adjustments is written in the memory in the microcomputer 18. If the resistance values of the resistors 52, 54, 56, and 64 are denoted by $R_{52}$, $R_{54}$, $R_{56}$, and $R_{64}$, and the supply voltage by Ve, the output voltage of the amplifier 58 by $V_{58}$, and the non-inverting input terminal voltage of the amplifier 58 by $V_{in}^+$, the following equation holds.

$$\frac{\frac{R_{54}}{R_{52} \cdot R_{54}} V_e \cdot R_{64} + V_{58} \cdot R_{56}}{R_{64} + R_{56}} = V_{in}^+ \tag{11}$$

By transforming Eq. (11), we have:

$$V_{58} = \frac{(R_{64} + R_{56}) \cdot V_{in} - \frac{R_{54}}{R_{52} + R_{54}} V_e \cdot R_{64}}{R_{56}} \quad (12)$$

Then Vin+ is a voltage value representing the flow rate, and by adjusting the resistance values of the resistors $R_{52}$, $R_{54}$, $R_{56}$, and $R_{64}$, the input-output characteristics of the thermal type flow sensor are adjusted.

Figure 4A:
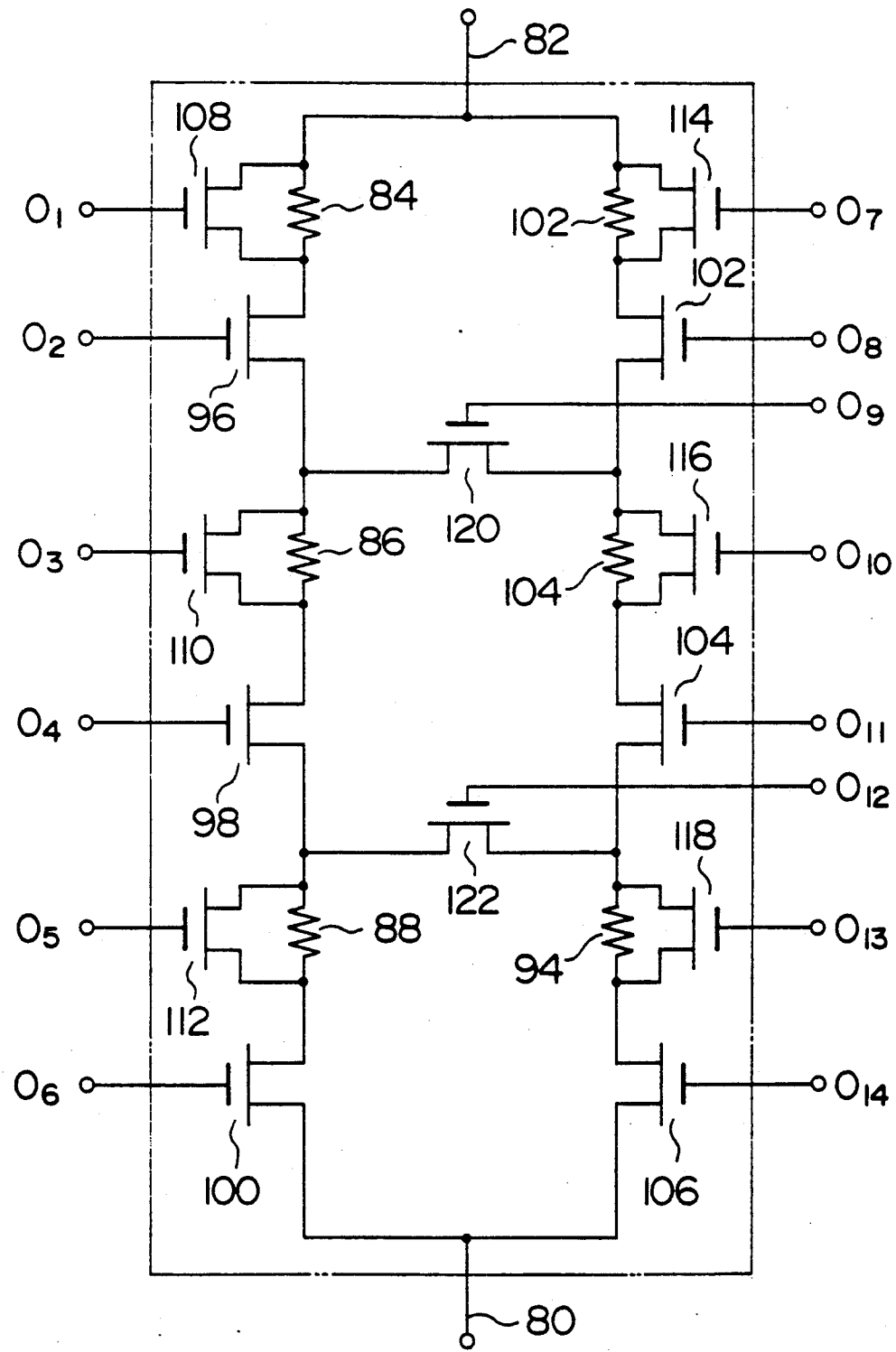
FIGS. 4A and 4B are diagram showing variable resistors for adjustment.

FIG. 4A shows a detailed arrangement of adjusting means for adjusting the resistance values of the variable resistors of FIG. 1. The adjusting means comprises fixed resistors 84 to 104 connected in series between output terminals 80 and 82, semiconductor changeover switches 96 to 106 connected in series with the respective fixed resistors, semiconductor switches 108 to 118 connected in parallel with the respective resistors 84 to 104, and semiconductor switches 102 and 122 placed in the circuit for connecting the connecting points between the resistors in ladder form. When the output signals $O_1$ to $O_{14}$ of the microcomputer 18 are supplied to the respective semiconductor switches, the switches are put in ON or OFF state, making it possible to change the resistance values. For example, if the voltage of the output signal $O_1$ is set at "HIGH" level, the switch 108 is turned on to short-circuit the resistor 84. In this way, by use of digital signals from the microcomputer 18, the resistance values of the variable resistors can be adjusted.

Figure 4B:
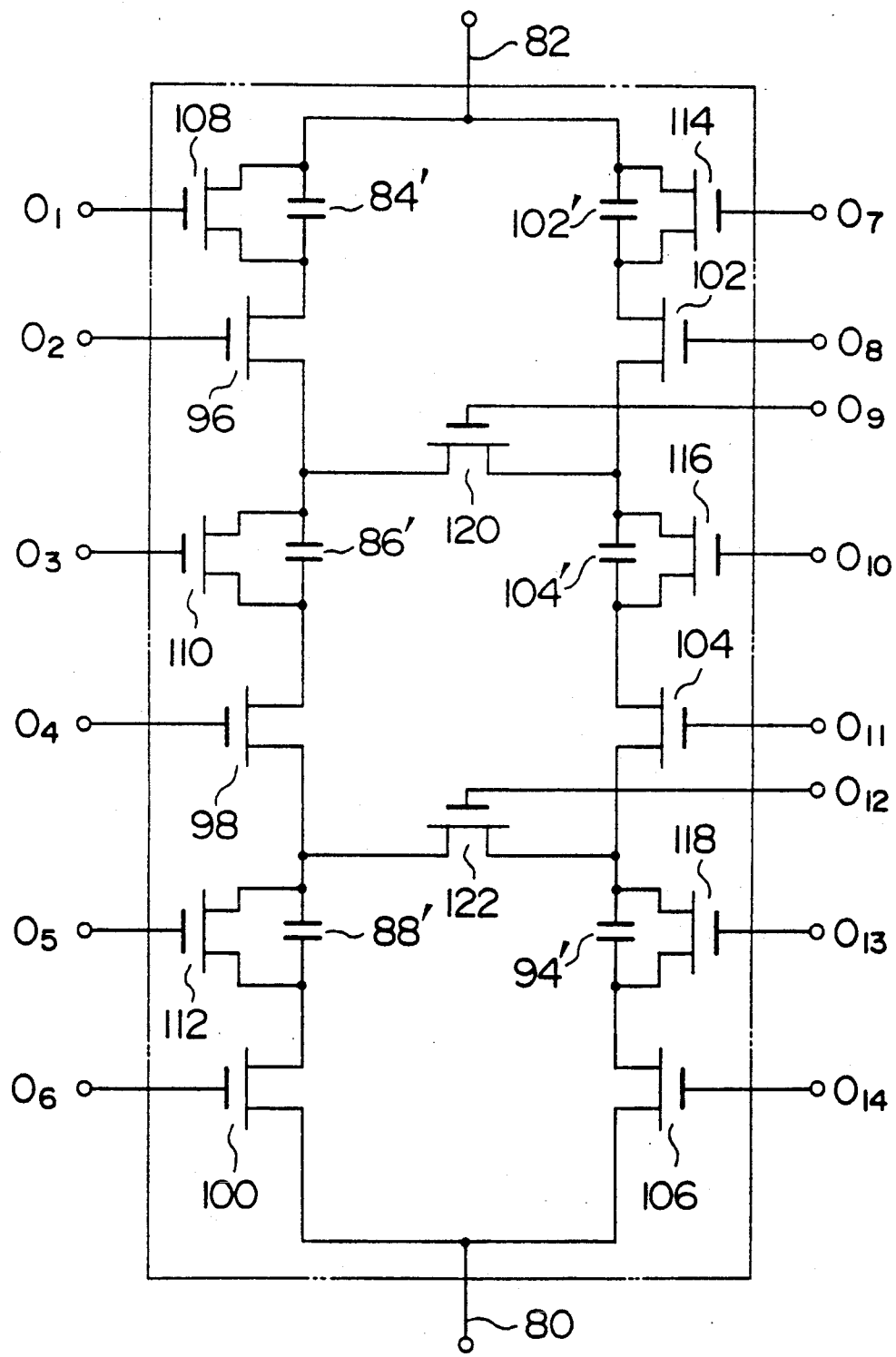

FIG. 4B shows the circuit arrangement of the variable capacity 40. Since the circuit arrangement is the same as in FIG. 4A, excepting that the fixed resistors are replaced with fixed capacitors (the reference numerals with '), description of the circuit arrangement will be omitted.

Figure 2D:
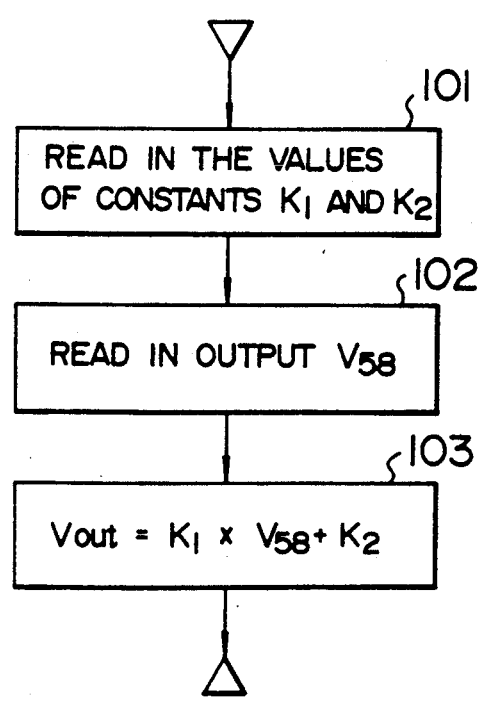
Figure 2B:
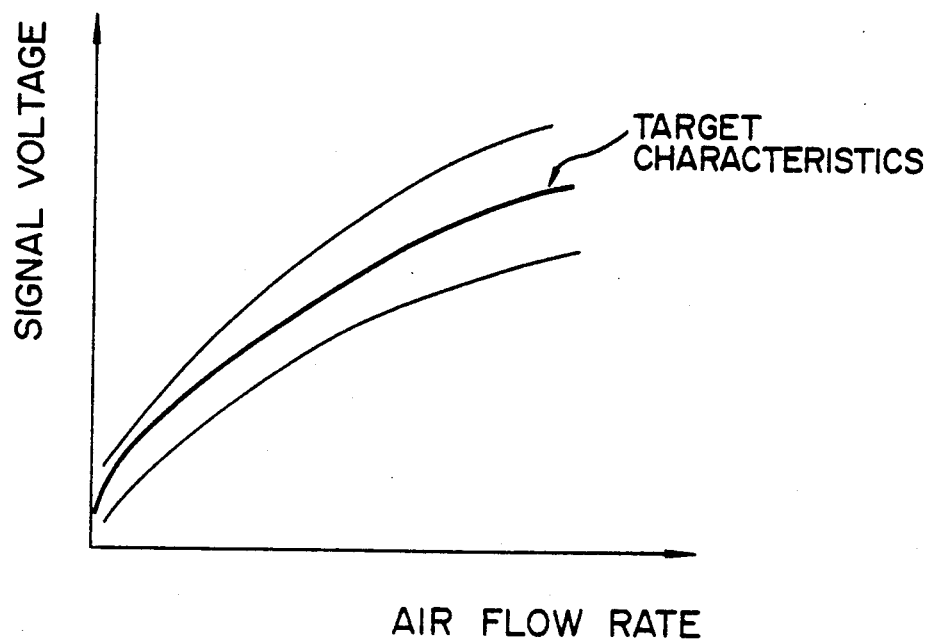
FIGS. 2B and 2C are characteristic diagram.

Another embodiment of Step IV of FIG. 2A will be described. If the resistors 52, 54, 56, and 64 are not adjusted, the relation between output 63 of the amplifier 58 of FIG. 1 and the air flow rate deviates from the target characteristics because of the variation in surface area of the heat-generating resistance element, etc. as shown in FIG. 2B. In order to prevent this phenomenon, the constants $K_1$ and $K_2$ are found in advance so that the target characteristics can be complied with at specified air flow rates $Q_{a1}$ and $Q_{a2}$, and the above-mentioned relation is brought close to the target characteristics by executing the following calculation.

$$V_{out} = K_1 \times V_{58} + K_2$$

where $V_{58}$: output signal of amplifier 58

Figure 2C:
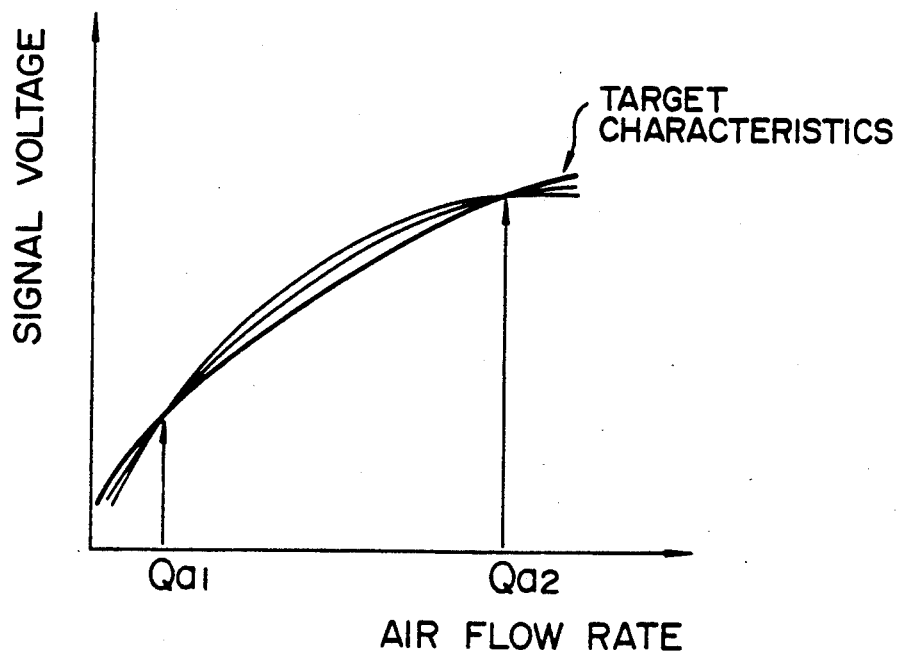
Figure 5:
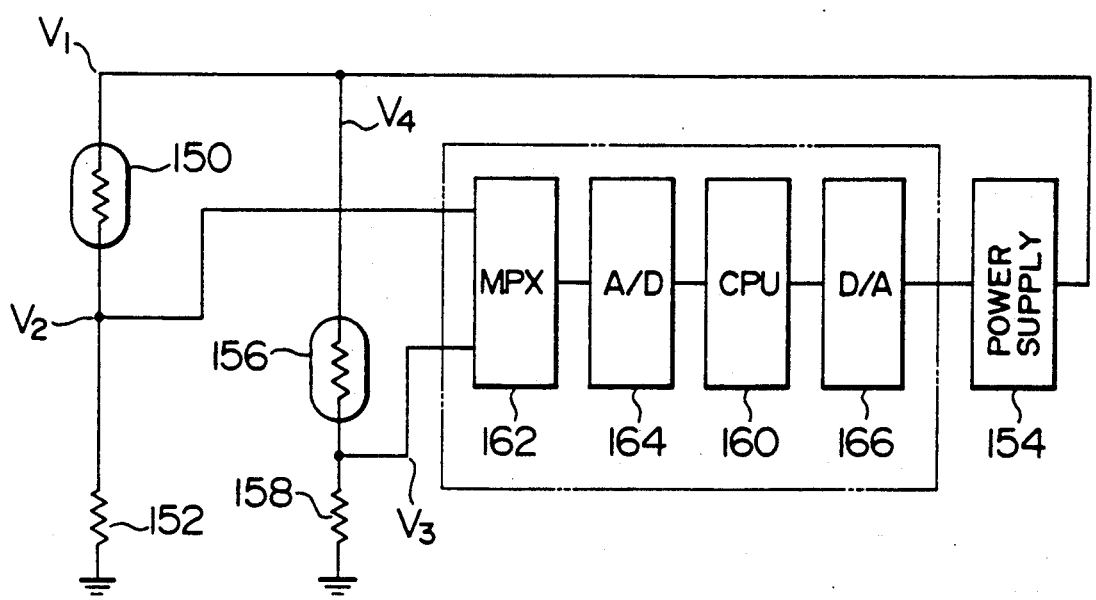
FIG. 5 shows another embodiment of the present invention.

FIG. 2C shows the relation between the calculation result and the air flow rate. Compared with FIG. 2B, the deviation from the target characteristics can be reduced. FIG. 2D shows the flowchart. The relation between the air flow rate and output of $V_{58}$ is measured in advance to obtain values $K_1$ and $K_2$, which values are written in ROM. At step 101, the values of $K_1$ and $K_2$ which have been written in the ROM are read in CPU. At step 102, the output $V_{58}$ of the amplifier 58 is written in the CPU. At step 103, the arithmetic operation of the above-mentioned equation is executed. This method produces the effect that the variable resistors of FIG. 4A can be done away with. FIG. 5 is a block diagram showing another embodiment of this invention. A heat-generating resistance element 150 for measuring the air flow rate and a resistor 152 for current detection, which are in series, are connected to a power supply section 154. A resistor 156 for measuring the air temperature, connected in series with a resistor 158 for current detection, is connected to the power supply section 154. A microcomputer 160 selects the voltage $V_2$ of the resistor 152 and the terminal voltage $V_3$ of the resistor 158 by means of a multiplexer 162, and after converting the voltage by an A-D converter 164 into digital signals, accepts the signals. The microcomputer 160 calculates the temperature Th of the heat-generating resistance element 150 and the air temperature Ta, and controls the voltage supplied to the heat-generating resistance element 150 so that the temperature difference Th - Ta is constant. The microcomputer 160 calculates the voltage $V_1$ fed back to the heat-generating resistance element 150, and outputs a voltage signal through a D-A converter 166 and the power supply section. The multiplexer 162, A-D converter 164, microcomputer 160, and D-A converter are arranged on the same insulating board or semiconductor board. Also, the microcomputer 160 determines the ignition timing and injection rate according to the air flow rate, internal combustion engine speed and air-fuel ratio signal from the $O_2$ sensor.

The relation between the heat-generating resistor 150 and the resistor 156 for air temperature compensation is expressed by the following equations.

$$Rh = Rh_0 (1 + a \cdot Th) \quad (13)$$

$$Rk = Rk_0 (1 + a \cdot Ta) \quad (14)$$

where
Rh: resistance value of heat-generating resistance element 150
$Rh_0$: value of Rh when Th=0
Rk: resistance value of air temperature compensating resistor 156
$Rk_0$: value of Rk when Ta=0
$a$: temperature coefficient of resistance
Also, the following relations hold.

$$Rh = (V_1 - V_2)/(V_2/R_1) \quad (15)$$

$$Rk = (V_4 - V_3)/(V_3/R_2) \quad (16)$$

where
$R_1$: value of resistor 152
$R_2$: value of resistor 158
Therefore, from Eqs. (13) and (14), we obtain:

$$Th = \frac{1}{a} \cdot \frac{(V_1 - V_2)}{(Rh_0 \cdot V_2/R_1)} \quad (17)$$

$$Ta = \frac{1}{a} \cdot \frac{(V_4 - V_3)}{(Rk_0 \cdot V_3/R_2)} \quad (18)$$

The output voltage $V_1$ is determined by PID control as follows. For example, when control is performed so that Th−Ta is 200° C.

$$V_1 n+1 = V_1 n + K_1 (\Delta Tn - 200) + K_2 (\Delta Tn - \Delta Tn - 1) + K_3 \Sigma (\Delta Tn - 200) \quad (19)$$

where $K_1$, $K_2$, and $K_3$ are constants, $\Delta T = Th - Ta$, and n+1, n and n−1 indicate the next, current and previous measurements.

The air flow rate can be obtained by King's formula. King's formula shows the relation between the power and radiated heat quantity of a heat-generating resistor and is expressed as follows.

$$I^2 = (C_1 + C_2 \sqrt{Qa})(Th - Ta) \quad (20)$$

where
Qa: air flow rate
I: current flowing through the heat-generating resistor
$C_1, C_2$: functions of air temperature Therefore, the following equation is obtained. $Th-Ta$ is kept constant by microcomputer control, and for $C_1$ and $C_2$, values written in advance in the ROM according to air temperature Ta are used. $I^2Rh$ can be calculated by $I^2RH = V_2 \cdot (V_1 - V_2)/R_1$.

Thus, by use of Eq. (21), the air flow rate Qa can be obtained.

Figure 6A:
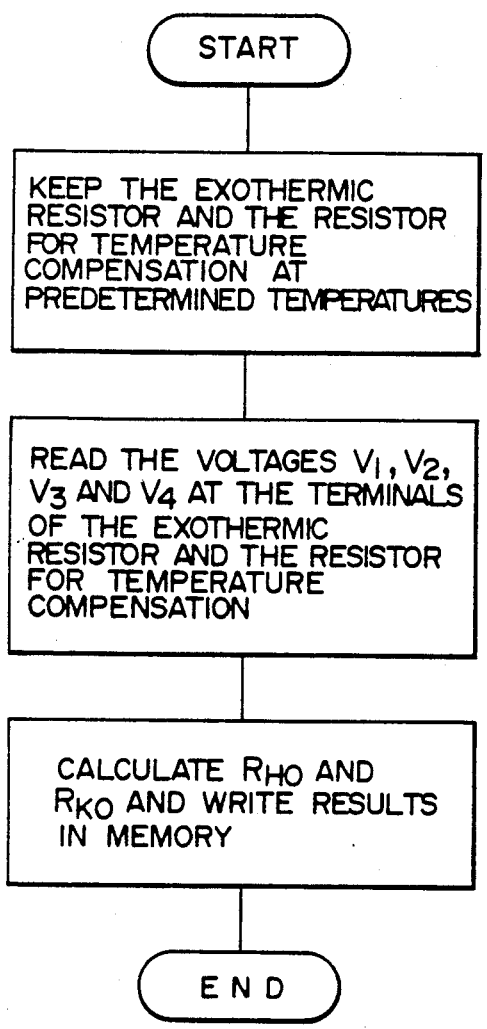
FIGS. 6A, 6B and 6C are flowcharts for adjustment processes.
Figure 6B:
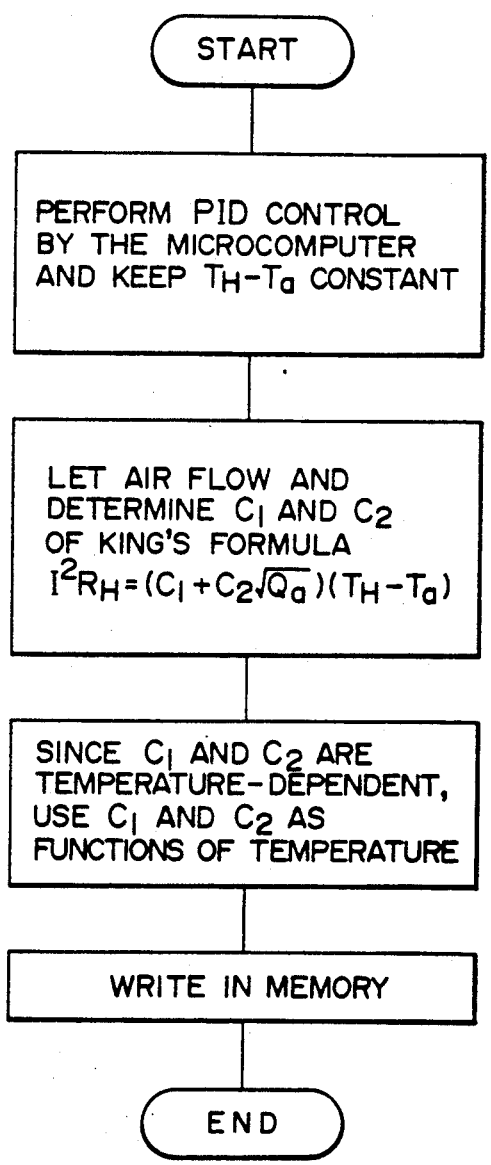
Figure 6C:
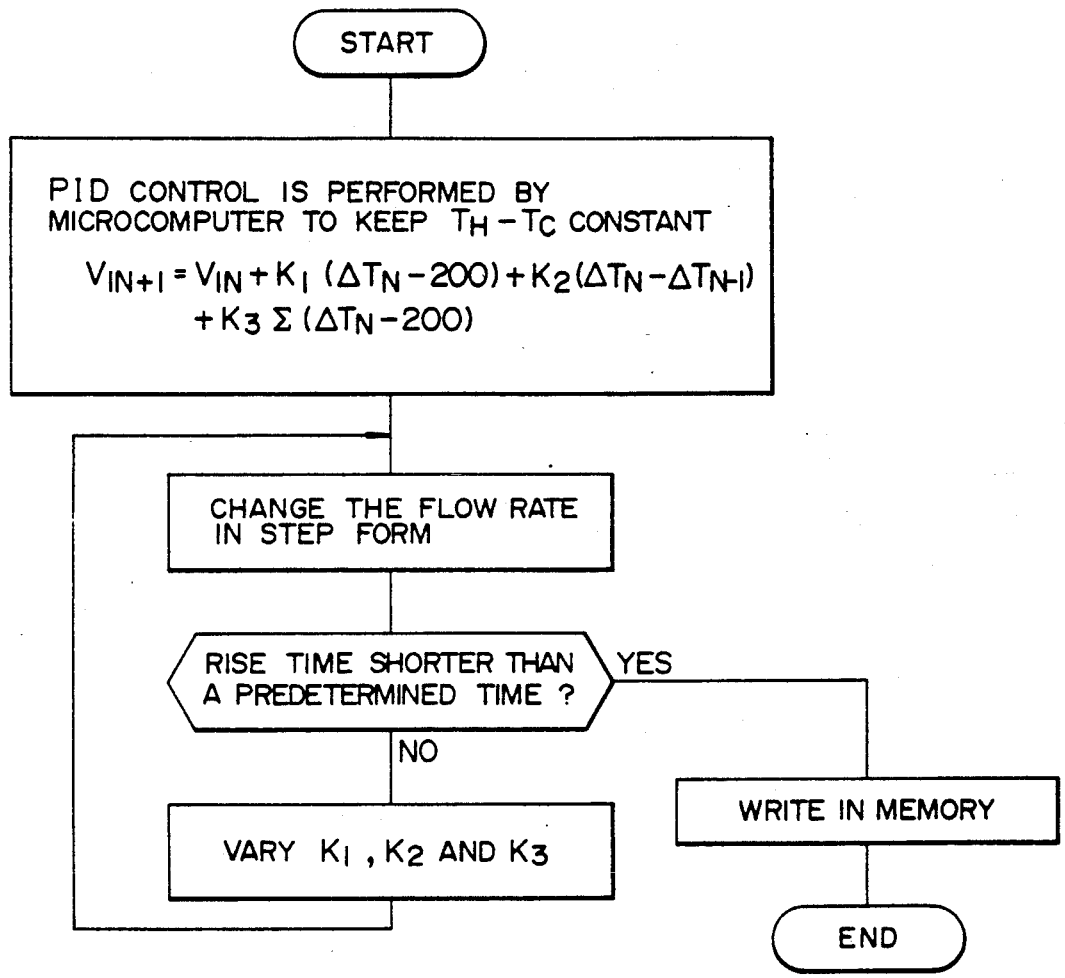

FIGS. 6A, 6B and 6C show the adjusting processes of the air flow sensor of FIG. 5. FIG. 6A is a flowchart for determining the resistance values Rho and Rko. FIG. 6B is a flowchart for determining the constants $C_1$ and $C_2$. FIG. 6C is a flowchart for determining the speed of response to change in air flow rate.

Figure 7:
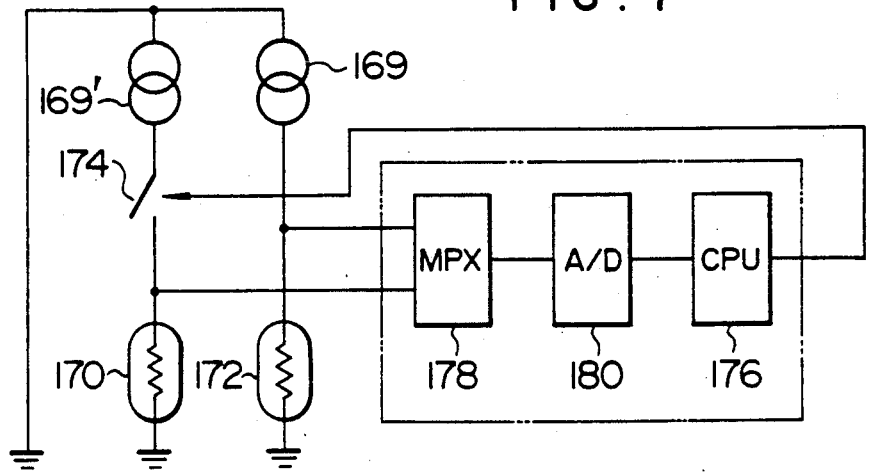
FIG. 7 shows yet another embodiment of the present invention.

FIG. 7 is a diagram showing a still another embodiment of this invention. Constant-current power sources 169' and 169 conduct a current to a heat-generating resistance element 170 and a resistance element 172 for air temperature compensation, respectively. A switch 174 is turned on with constant periods T by a microcomputer 176. If the switch 174 is turned off when the terminal voltage of the heat-generating resistance element 170 exceeds the threshold value, the conduction rate D of current (D = current conduction time/T) is expressed as follows.

$$D = K_1 + K_2 \sqrt{Qa} \quad (21)$$

Thus, the conduction rate D is a function of the air flow rate Qa, where $K_1$ and $K_2$ are functions of air temperature, and the threshold value is varied by the air temperature and determined so as to satisfy the following equation.

(Terminal voltage of heat-generating resistance element) = $K \cdot$ (terminal voltage of temperature compensating resistance element)   (22)

where K is a constant.

The terminal voltages of the heat-generating resistance element 170 and the resistance element 172 for air temperature compensation are selectively accepted by means of a multiplexer 178, and are input into a microcomputer 176 through an A-D converter 180. The microcomputer 176 also performs control of the fuel injection rate and ignition timing of the internal combustion engine. The multiplexer 178, the A-D converter 180, and the microcomputer 176 are mounted on the same insulating board or semiconductor board as in FIG. 1.

Figure 8A:
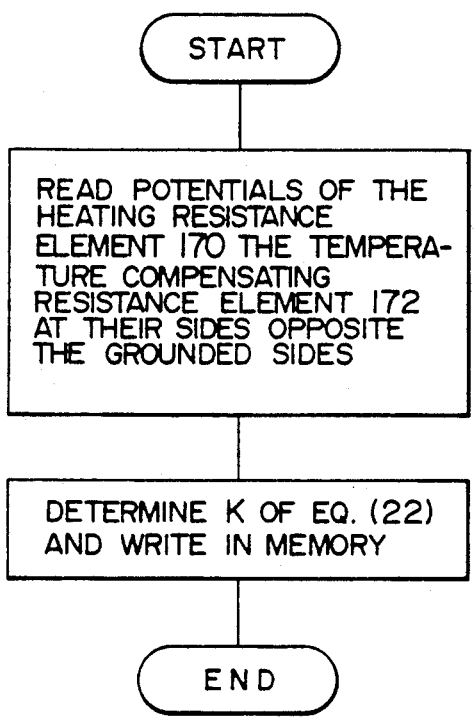
FIGS. 8A and 8B are flowcharts of adjustment processes.
Figure 8B:
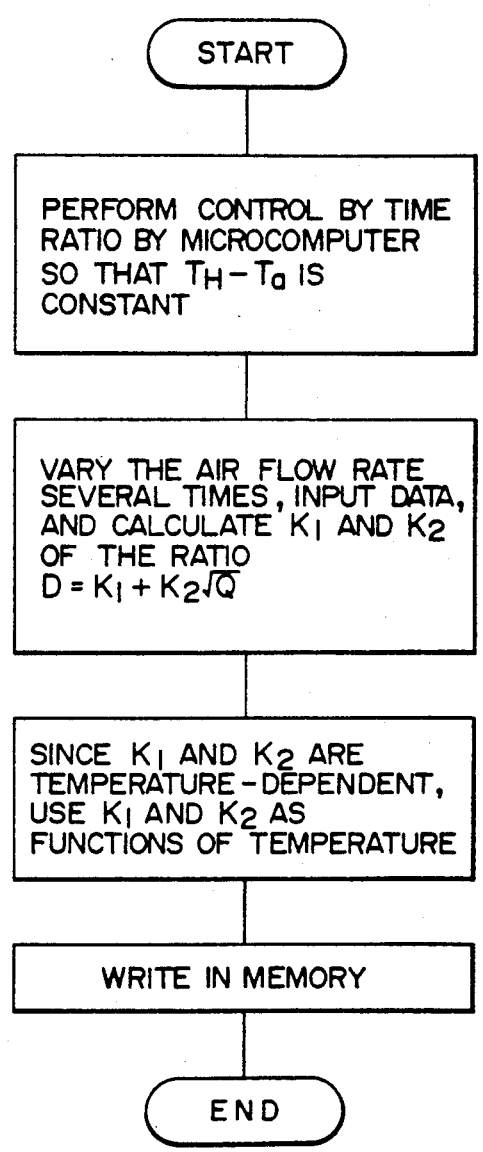

FIGS. 8A and 8B show the adjusting processes of the air flow sensor of FIG. 7. The processes of FIGS. 8A and 8B are executed with a ROM writer connected to the microcomputer of FIG. 7. The process of FIG. 8A determines the value of K of Eq. (22) so that the relation between the temperatures Th and Ta at the threshold value is constant. The process of FIG. 8B is performed to set $K_1$ and $K_2$.

Figure 9:
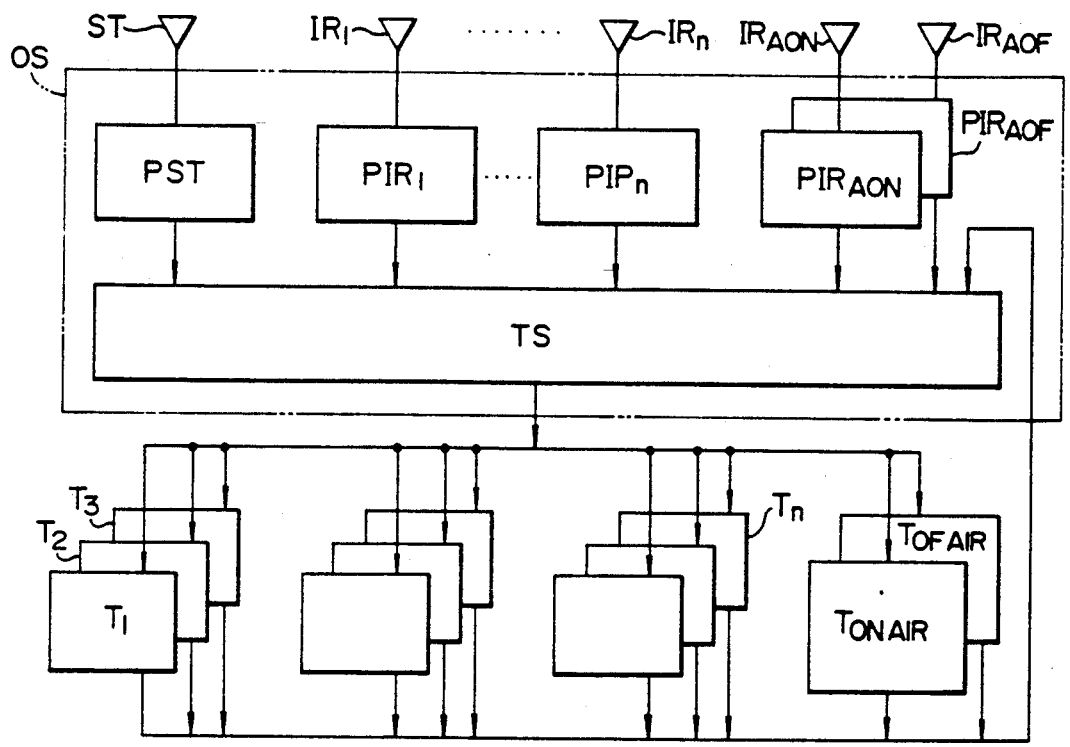
FIG. 9 is a diagram showing a software system of a microcomputer.

FIG. 9 shows a software system of an internal combustion engine control apparatus for automobiles. This system includes a start interrupt process PST, interrupt processes $PIR_2$ to $PIR_n$ for internal combustion engine control, a task scheduler TS, and control tasks $T_1$ to $T_n$. In addition, the system includes an air flow sensor interrupt for on-line process for air flow rate measurement $IR_{aon}$, an interrupt for off-line adjustment of the air flow sensor $IR_{aof}$, an on-line interrupt process of the air flow sensor $PIR_{aon}$, an off-line interrupt process of the air flow sensor $PIR_{aof}$, an adjustment task of the air flow sensor $T_{ofair}$, and an on-line process for flow rate measurement of the air flow sensor $T_{onair}$. In the apparatus arranged as shown in FIG. 9, the air flow sensor is adjusted by carrying out an interrupt for off-line adjustment $Ir_{aof}$, an off-line interrupt process $PIR_{aof}$, and an adjustment task $T_{ofair}$. In the adjustment task $T_{ofair}$, the flowchart of FIG. 2 is used for the air flow sensor of FIG. 1, the flowchart of FIG. 6 is used for the sensor of FIG. 5, and the flowchart of FIG. 8 is used for the sensor of FIG. 7.

After the adjustment is finished, in the ordinary operation of the internal combustion engine, an air flow sensor interrupt for on-line processing $IR_{aon}$, an on-line interrupt process $PIR_{aon}$, and an on-line process for flow rate measurement $T_{onair}$ are used. In the on-line process $T_{onair}$, processes such as calculation control for air flow rate measurement are performed. It ought to be noted that change-over among the off-line adjustment interrupt $IR_{aof}$, off-line interrupt process $PIR_{aof}$, adjustment task $T_{ofair}$, and air flow sensor interrupt $IR_{aon}$, on-line interrupt process $PIR_{aon}$, on-line process for flow rate measurement $T_{onair}$ is effected with a manually-operated switch, for example.

Figure 10:
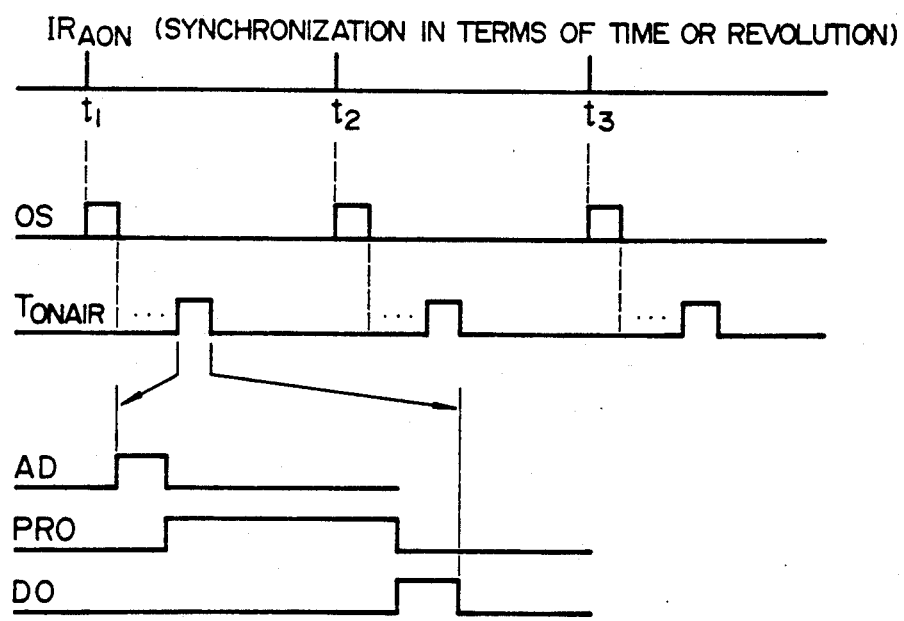
FIG. 10 is a diagram showing a process in the microcomputer.

FIG. 10 shows the relation of the operating system OS with air flow sensor interrupt $IR_{aon}$ and task $T_{onair}$ for on-line processing. In FIG. 9, AD indicates analog-digital conversion, PRO indicates a process for air flow rate measurement, and DO indicates data output and writing to the output register. In the task control shown in FIG. 10, when an air flow sensor interrupt $IR_{aon}$ occurs by synchronization in terms of time or revolution, the microcomputer executes under the management by the OS a task $T_{onair}$ comprising analog-signal conversion AD, a process for air flow rate measurement PRO, and data output and writing to the output register DO.

Figure 11:
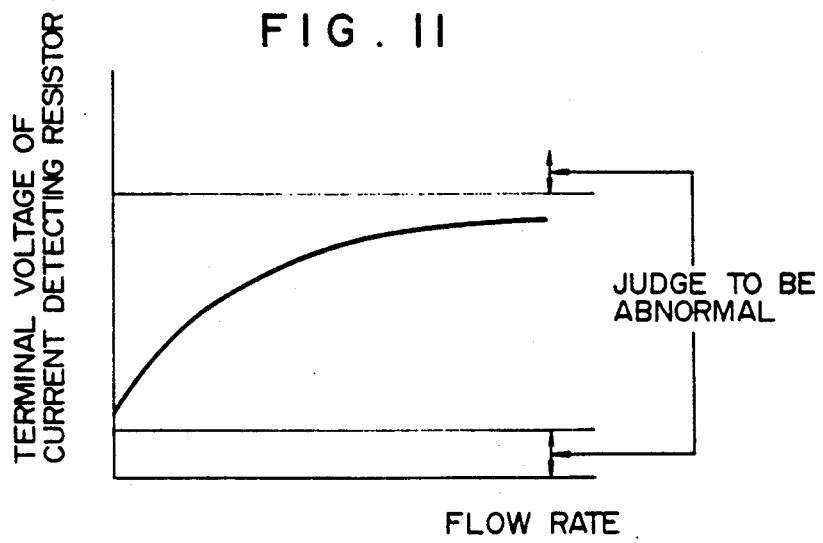
FIG. 11 is a diagram for explaining the principle of abnormality diagnosis.
Figure 12:
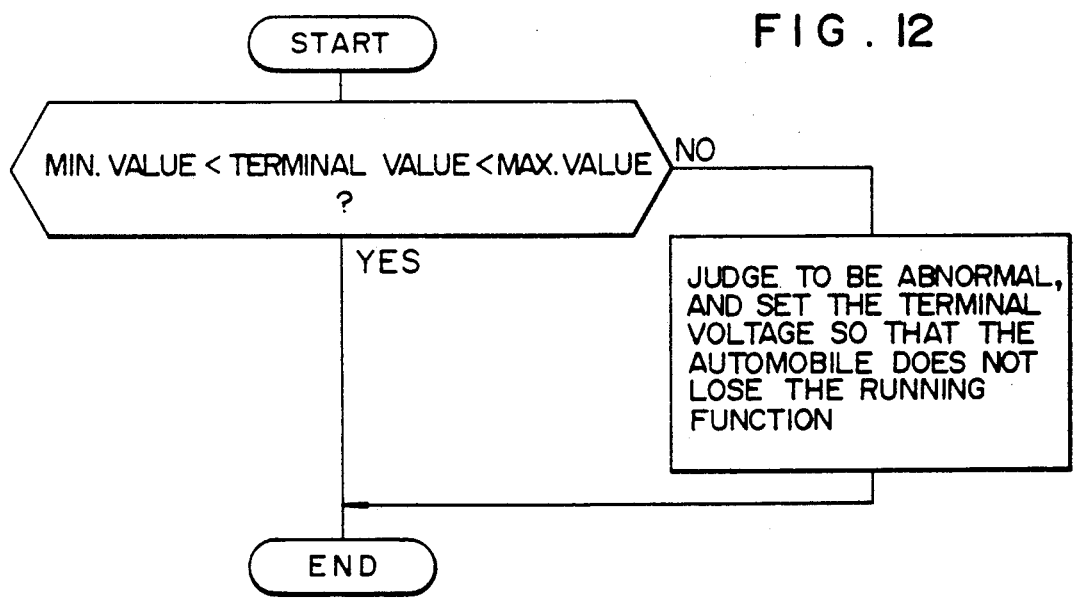
FIG. 12 is a flowchart of abnormality diagnosis.

FIG. 11 shows the abnormality diagnosis method of the air flow sensor. In the air flow sensor shown in FIG. 5, the terminal voltage of the current detecting resistor 152 changes with the flow rate and temperature, but limits are put in advance to the range of the change. The terminal voltage is first input into the microcomputer 166 through the A-D converter 164, and then a decision is made whether or not the terminal voltage exceeds a predetermined voltage. If the predetermined voltage is exceeded, a decision of abnormality is made, a terminal voltage is set automatically so that the automobile does not operate with less than its necessary minimum running function, and this is notified to the driver. This process is shown in the flowchart of FIG. 12.

In the air flow sensor shown in FIG. 7, when abnormality diagnosis is made, the terminal voltage of the heat-generating resistor 170 is checked and a decision is made while the switch 174 stays on. Abnormality diagnosis for the resistor 172 for air temperature compensation can be performed regardless of the on or off state of the switch 174.

Figure 14:
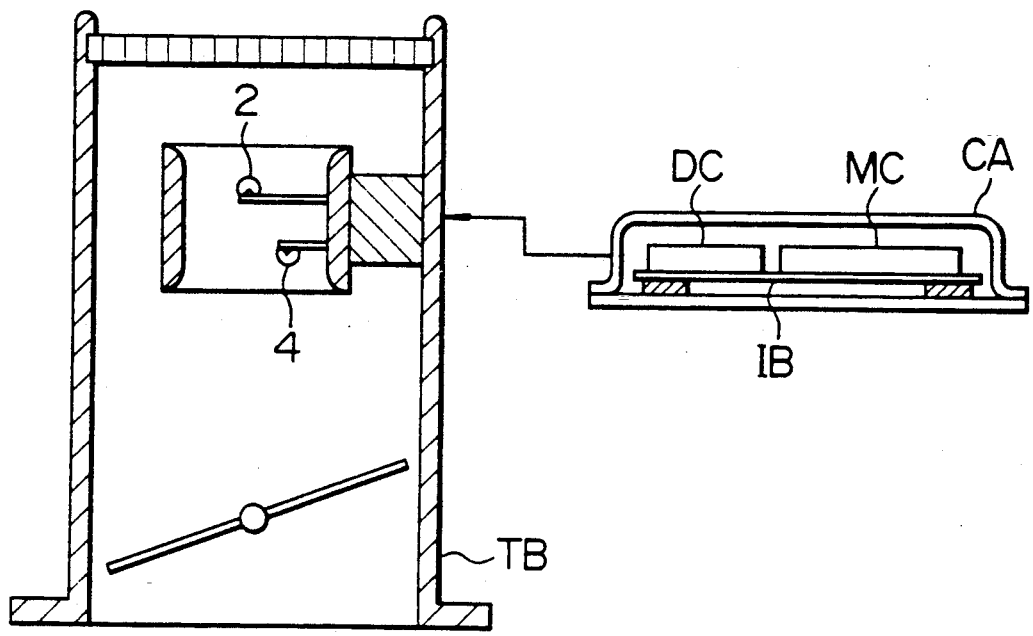
FIGS. 14 to 17 are diagrams showing mounted conditions of the internal combustion engine control apparatus.
Figure 15:
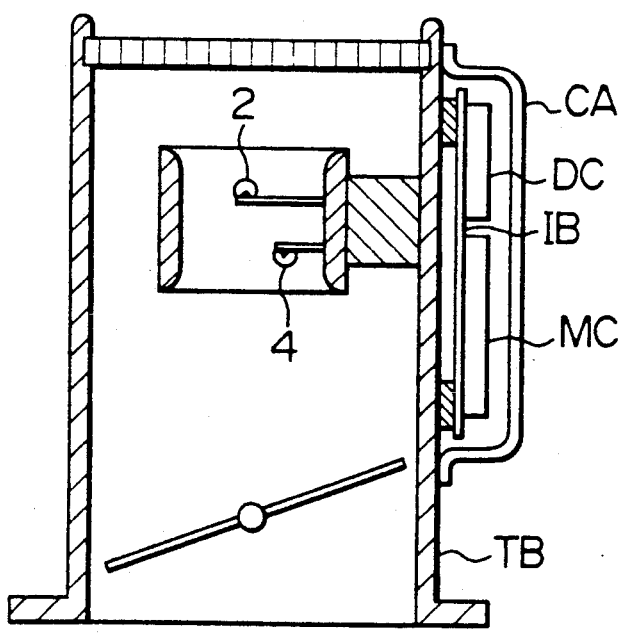

FIGS. 14 and 15 show an example of an arrangement in which a microcomputer MC and a driver circuit (feedback circuit) DC of the thermal type air flow sensor are mounted on the same insulating board.

In FIGS. 14 and 15, TB indicates an intake air tube, at which a hot-wire resistor and temperature detecting resistors 2 and 4 of the thermal type air flow sensor are arranged.

The microcomputer 18, air flow sensor driver circuit, etc. are mounted on a common insulating board IB, and they are contained in a metal-made case CA.

In FIG. 14, the case CA and the intake air tube TB are separate members, but in FIG. 15, the case CA and the intake air tube TB are combined in one body.

Figure 16:
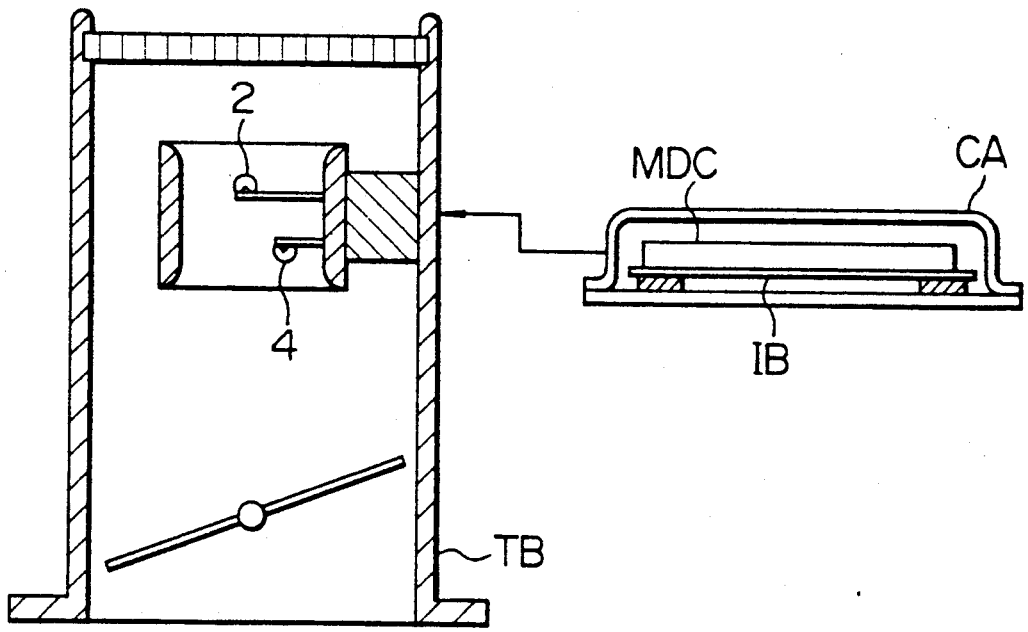
Figure 17:
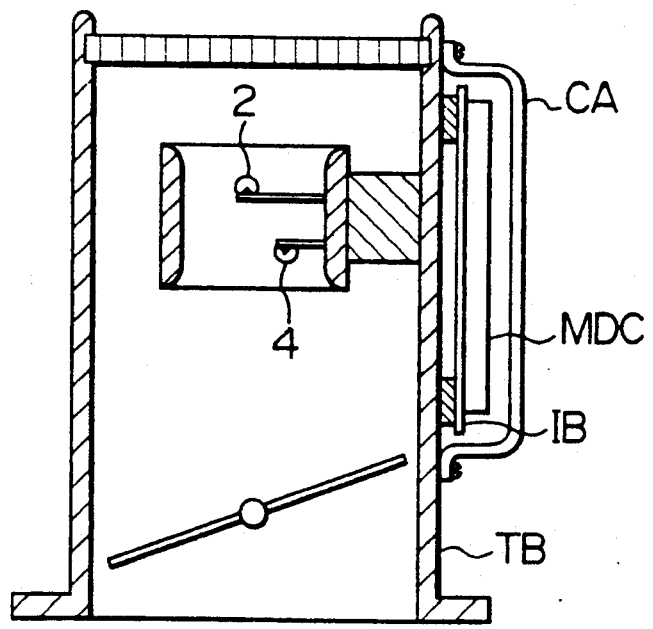

FIGS. 16 and 17 show an example of arrangement in which the microcomputer and the thermal type air flow sensor driver circuit are mounted on the same semiconductor board.

In FIGS. 16 and 17, an LSI MDC incorporating the microcomputer and the air flow sensor driver circuit is formed on a common semiconductor board. This board is mounted to the insulating board IB. All those parts are contained in a metal case CA. The above-mentioned semiconductor board is formed as an analog-digital hybrid LSI.

Also in this case, like in FIGS. 14 and 15, the case CA is separate from the intake air tube TB or they are combined in one body. Therefore, it is possible to make a choice between the two types of arrangement to suit the actual situation.

Next, an embodiment in which the idea of this invention is applied will be described.

As described in JP-B-62-23732 in which a thermal type flow meter is disclosed, the prior-art sensors which detect a physical quantity and output an electric signal are arranged such that the output of the driver in the form of an electric signal, converted from a physical quantity detected by a detecting element such as a hot wire, is used directly as output of the sensor.

As disclosed in JP-B-63-219859, there is an air flow sensor arranged such that in the sensor, there is provided a function which generates a specified identification signal according to the method of the detection element, and a specified conversion characteristic is selected in the engine control apparatus so as to suit the method of the detection element.

However, the prior-art sensors which use output of the driver directly as output of the sensor differ in output owing to the unevenness in quality of the component parts, including the hot wire dimensions, physical properties of the material constituting the hot wire, etc. If a system such as an engine control apparatus is constituted by such a sensor, there is a problem that the accuracy of the system is low. Owing to the unevenness in output, it is impossible to use another sensor, such as one with a different detection element in its existing state for a control system, namely, the conventional sensors are devoid of compatibility.

A sensor disclosed in JP-B-63-219859 can only accommodate detection elements of different methods, but are unable to tolerate the unevenness of sensor output. Therefore, there is basically the same problem with the prior art mentioned above.

An object of the present embodiment is to reduce the irregularity in output among sensors owing to the quality unevenness of component parts and provide a sensor excellent in detection accuracy.

Another object of the present embodiment is to provide a sensor and an engine control apparatus with compatibility in the control system and improved serviceability in the market.

Figure 18:
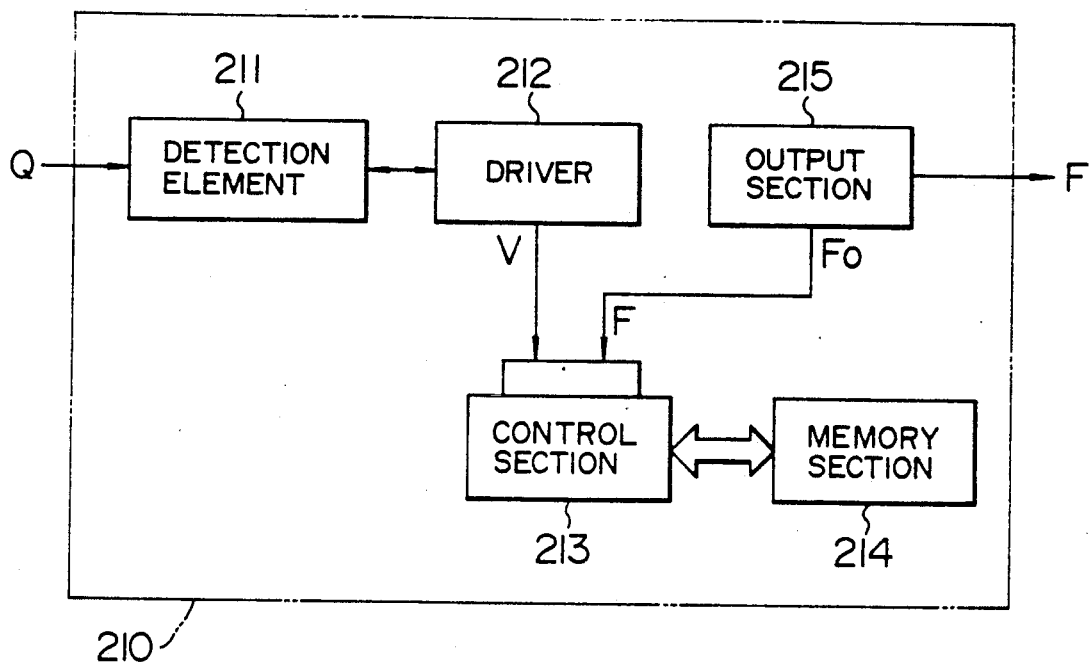
FIG. 18 is a diagram showing an arrangement of a sensor according to an applied embodiment of the present invention.

The construction of the sensor will be described in detail. In FIG. 18, a sensor 210 comprises a detection element 211 for detecting a physical quantity Q as an object of detection, a driver 212 for converting the physical quantity Q detected by the detection element 211 into an electric signal V, a memory section 214 for storing the relation between the electric signal V is output of the driver 212 and a sensor output Fo, which is an electric signal that the sensor 210 outputs, an output section 215 that generates an electric signal F that is sent out by the sensor 210, and a control section 213 which obtains a target value Fx of output from the output V of the driver 212 and the above-mentioned relation stored in the memory section 214, and drives the output section 215 according to this target value Fx.

Figure 19:
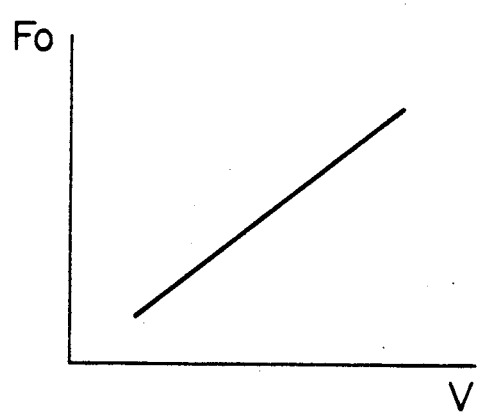
FIG. 19 is a diagram showing the relation between driver output and sensor output, stored in the memory section.

FIG. 19 shows the relation between the output V of the driver 212 stored in the memory section 214 and a target value Fo of sensor output. This graph is drawn by determining and plotting the relation between the driver output V and the target value Fo of sensor output in the manufacture of sensors, which will be described later.

Figure 20:
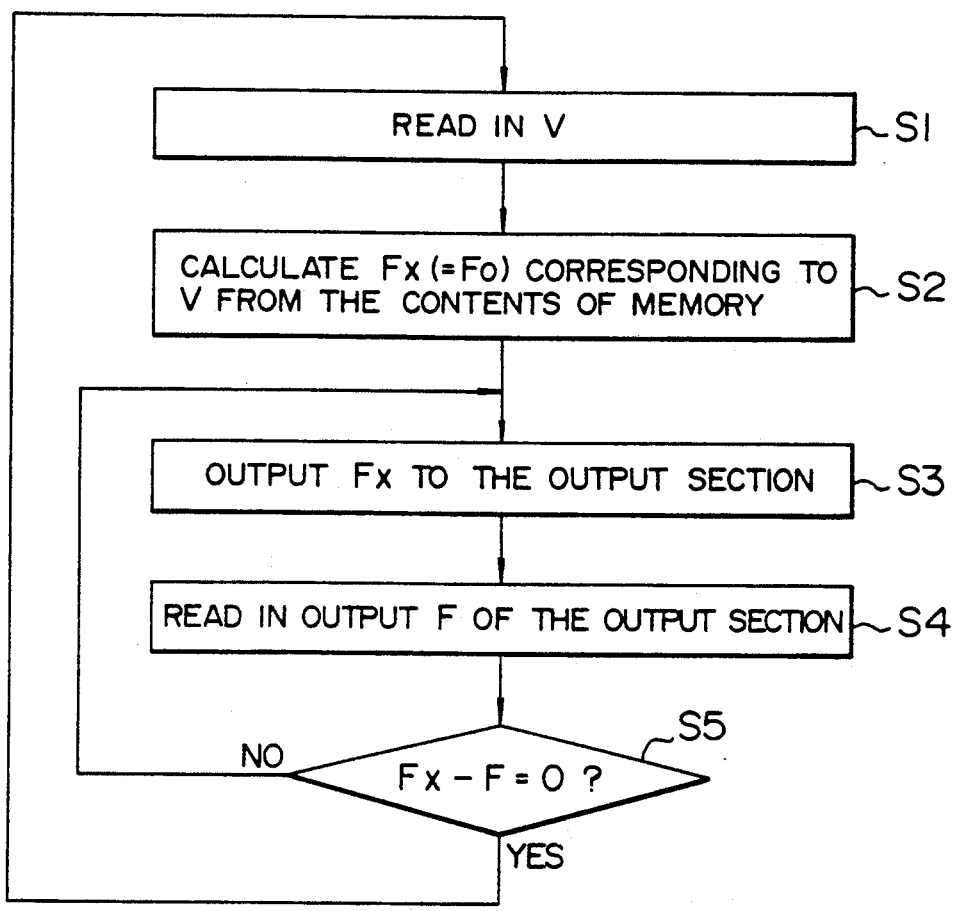
FIG. 20 is a flowchart for explaining the operation of the control unit.

The operation of the control section 213 will be described with reference to the flowchart shown in FIG. 20. First, output V of the driver 212 is read in (Step S1). From the above-mentioned relation stored in the memory section 214, a sensor output Fo is obtained which corresponds to the output V of the driver 212, and the sensor output is used as a target value Fx (Step S2). This target value Fx is output to the output section 215, which therefore is driven (Step S3). Then, output F of the output section 215 is read in as a feedback value (Step S4). A decision is made whether or not a deviation between the target value Fx and the feedback value F is zero (Step S5). The target value Fx continues to be output until the deviation becomes zero (Steps S3 to S5). When the deviation becomes zero, output V of the driver 212 is read in again (Step S1). The procedure described above is repeated. As the above procedure is executed, the output section 15 is controlled by the control section so that the electric signal F, which is sent out as a sensor output, agrees with the target value Fx.

Figure 22:
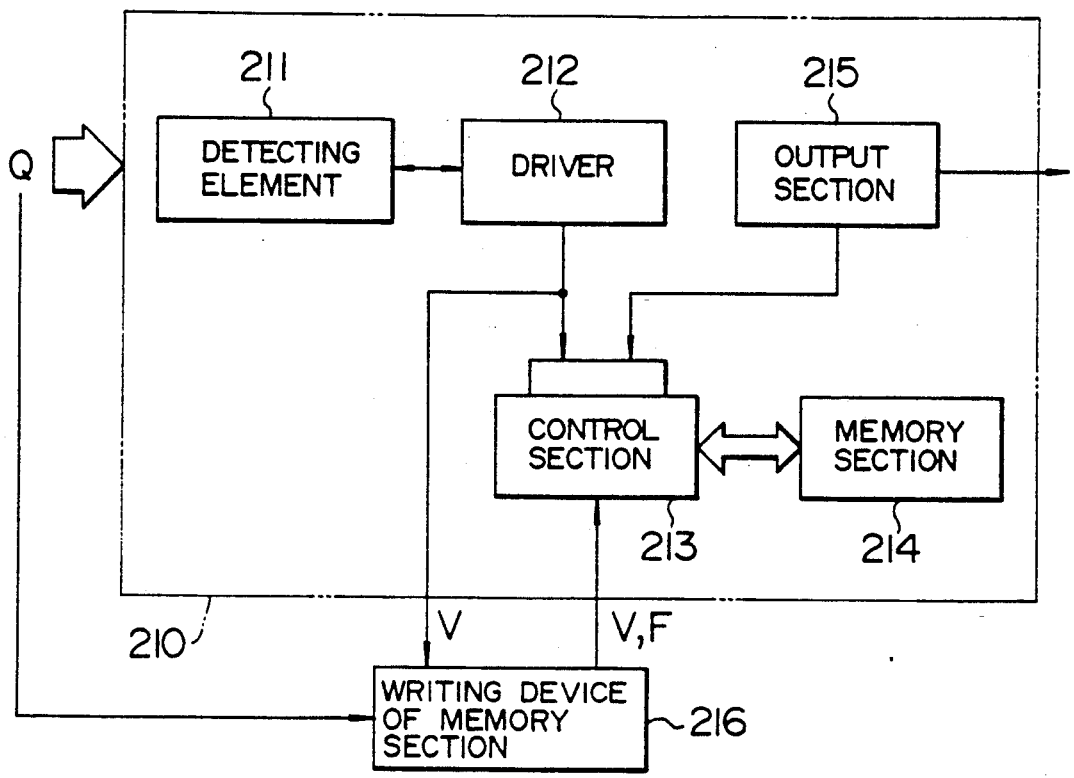
FIG. 22 is a diagram showing an arrangement for writing data in the memory section.

FIG. 22 shows the circuit arrangement of the sensor by which data is written in the memory section 214. Suppose a case where the detection element 211 is a hot wire and the sensor 210 is an air flow sensor. In making sensors of this type, the hot wires 211 tend to be uneven in size, physical properties of the material, etc., and the drivers 212 often have irregular quality because they are electronic parts. As a countermeasure, in the manufacturing process of a sensor 210, the relation between output Q of an air flow rate reference meter and output V of the driver is measured to a required number of times (64 points, for example), then a target value Fo of sensor output, which is in a fixed relationship with the output Q of the air flow rate reference meter, is determined and in consequence, the V-Fo characteristic shown in FIG. 19 is worked out and written by a memory-section writing device 216 into the memory section 214.

In the present embodiment arranged as described, even if there is unevenness of output V of the driver 212 among different sensors, because the sensor output Fo, which is in a fixed relation with the physical quantity 0, is used as a target value Fx of the sensor output through the medium, of the driver output V from the relation stored in the memory section 214, it is possible to put the characteristics of the physical quantity Q and the sensor output F in substantially a fixed relation, thereby greatly improving the detection accuracy.

The physical quantity Q - sensor output F characteristic is almost fixed. Therefore, if a sensor according to this embodiment is used, any sensor according to this embodiment can be treated as the same sensor, so that sensors according to this embodiment have high compatibility and serviceability in the market.

Figure 21:
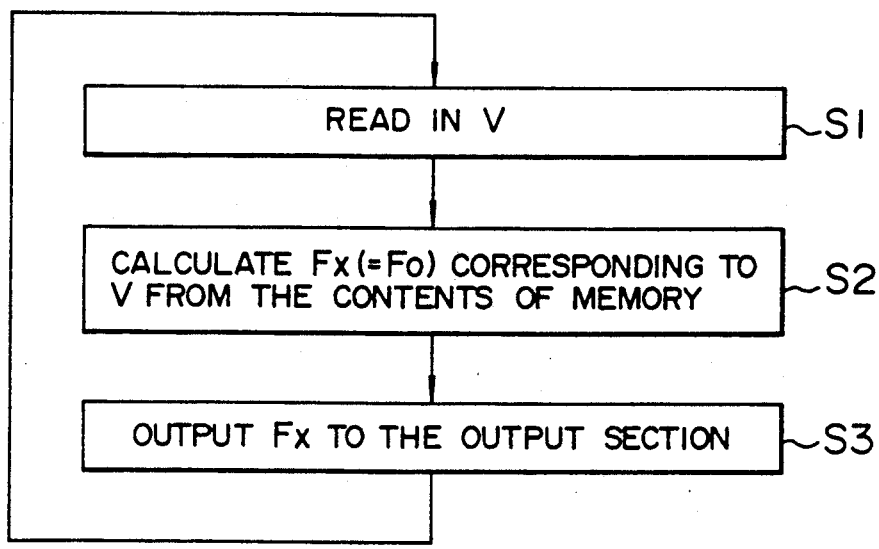
FIG. 21 is a flowchart for showing another example of the operation of the control unit.

In the foregoing embodiments the output F of the output section 215 is controlled in a closed loop by feeding the output back to the control section 213. The control method of the output section 215 by the control section 213 is not limited to this closed loop control. As shown in FIG. 21, the output section 215 may be controlled by open loop control by doing away with the Steps S4 and S5 of FIG. 20. The control section 213, memory section 214, and the output section 215 are generally integrated in one silicon chip. This arrangement puts a limit to the improvement of accuracy of the output section 215. As shown in FIG. 20, it is desirable from the viewpoint of securing control accuracy to perform feedback control of the output section 215. When the accuracy of the output section 215 is high however, the output section 215 may be controlled by open loop control. In this case, the operation of the control section 213 can be simplified.

Then, an embodiment wherein this concept is applied to the air flow sensor will be described with reference to FIGS. 23 to 27.

Figure 23:
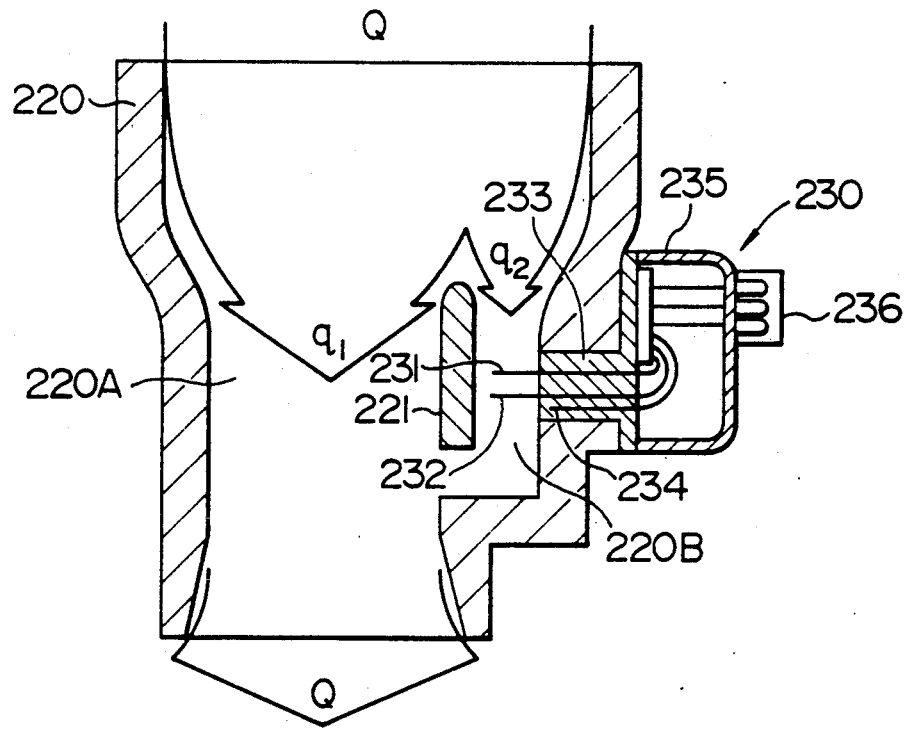
FIG. 23 is a sectional diagram showing a mounted condition of the air flow sensor in an embodiment in which the present invention is applied to the air flow sensor.

In FIG. 23, in a body 220 forming an air passage leading to an automobile engine, there are a main passage 220A and a bypass passage 220B. A quantity Q of air introduced into the whole air passage is divided above a partition wall 221, so that a quantity $q_1$ flows through the main passage 220A and a quantity $q_2$ flows through the bypass passage 220B, and the two flows join at the outlet of the bypass passage 220B.

An air flow sensor 230 comprises a detection element 231 of a hot wire type, provided at the bypass passage 220B, for detecting the air flow rate Q (hereafter referred to as the hot wire when occasion demands); an air temperature detector 232, provided at the same bypass passage 220B, for detecting the air temperature (hereafter referred to as the cold wire); and a support-member temperature detector 234 for detecting the temperature of the support member 233 (hereafter referred to as the wall temperature sensor), said support member temperature detector 234 being provided at that the part of the detection-element support member 233 which is close to the bypass passage 220B. The detection element 231, the cold wire 232 and the wall temperature sensor 234 are connected to a circuit board 235 on which the parts shown in FIG. 18 are arranged and interconnected by an electronic circuit, and are further connected to a terminal 236 for connection with an external circuit.

Figure 24:
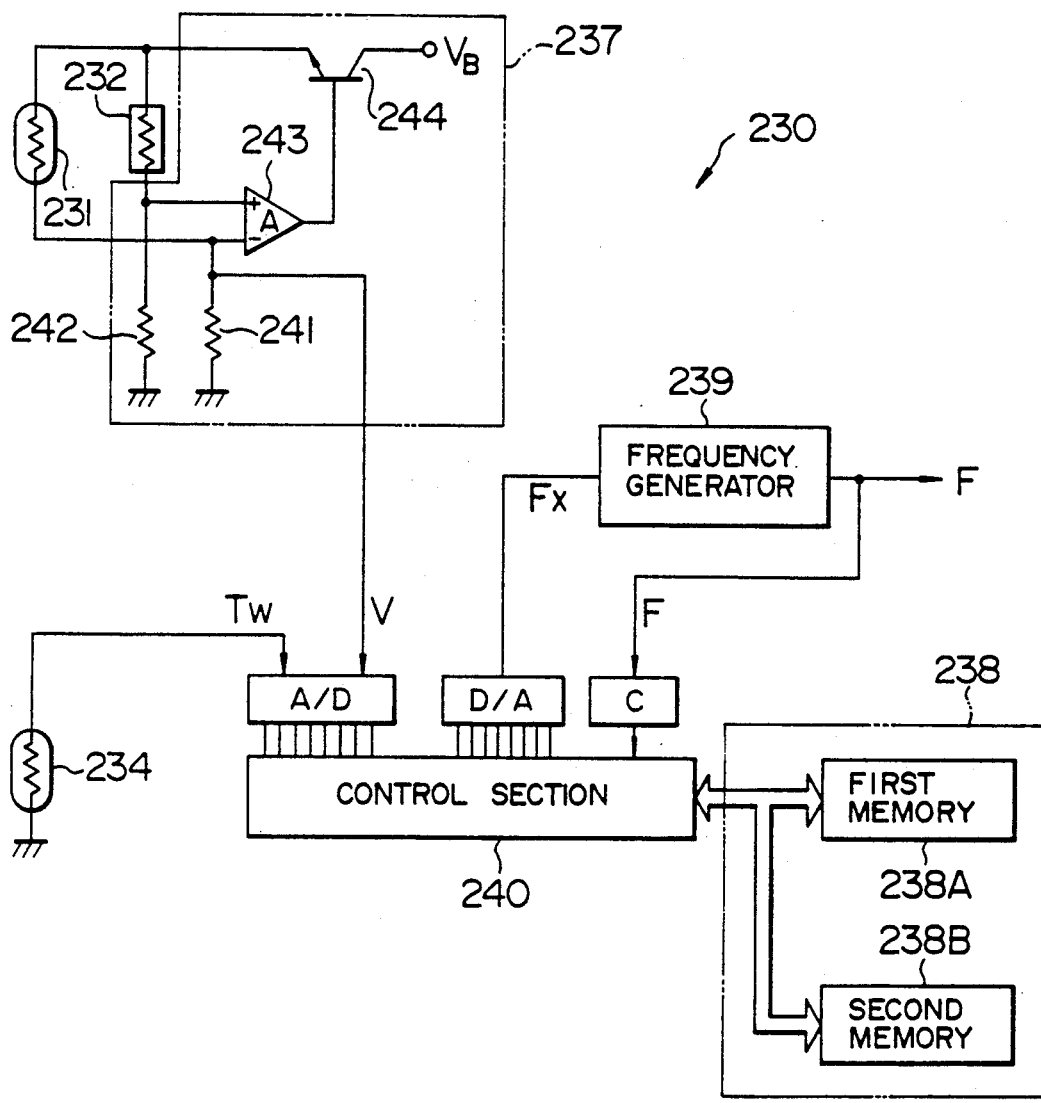
FIG. 24 is a diagram showing a circuit arrangement of the air flow sensor.

As a concrete example, FIG. 24 shows a circuit arrangement including the circuit board 235 of the air flow sensor 230. The air flow sensor 230 comprises a driver 237, a memory section 238, and a control section 240, which correspond to those of FIG. 18. The output section 139 is formed of a frequency generator.

The driver 237 comprises resistors 241 and 242, which form a bridge circuit with the hot wire 231 and the cold wire 232, a differential amplifier 243 and a transistor 244 to control a voltage applied to the bridge circuit. The voltage applied to the bridge circuit is controlled to equalize the mid-point voltages of the bridge circuit, so that the current flowing through the hot wire 231 becomes a function of the air flow rate. This hot-wire current is detected at the resistor 241 and the voltage across the resistor is used as output V of the driver 237.

The memory section 238 comprises first and second memories 238A and 238B. The first memory 238A, like the memory section 214 of FIG. 18, has stored therein the relation between the output V of the driver 237 and output Fo of the sensor as shown in FIG. 19. The second memory 238B has stored therein a correction coefficient K to correct the effect of the wall temperature Tw detected by the wall temperature sensor 234.

Figure 25:
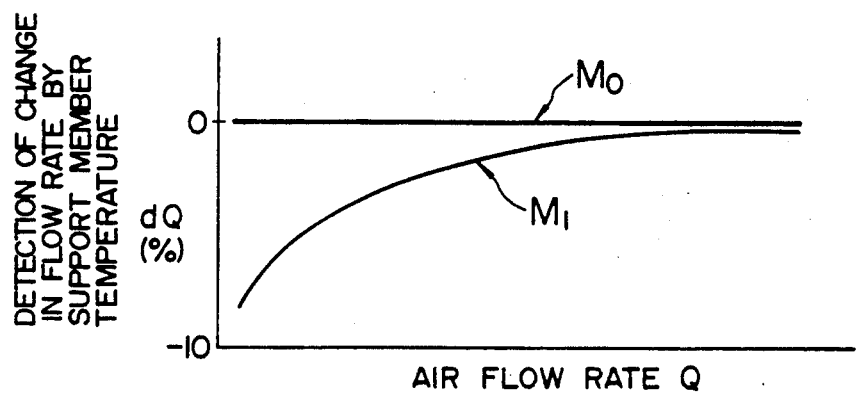
FIG. 25 is a temperature characteristic diagram showing the change in sensor output in relation to the air flow rate when the wall temperature of the support member changes.
Figure 26:
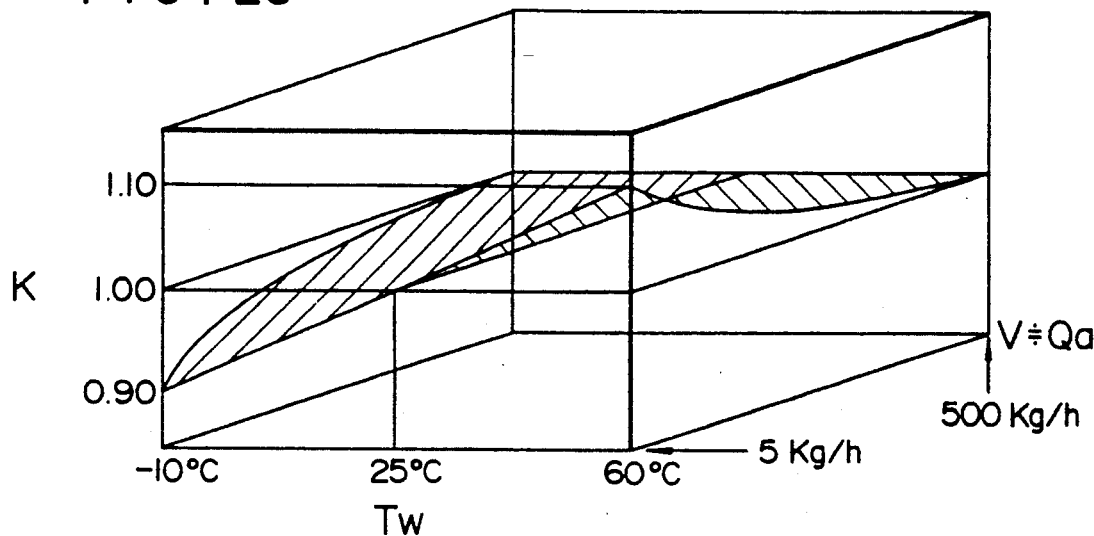
FIG. 26 is a diagram showing the setting contents of the correction factor K, which is stored in the memory section.

The correction coefficient K will now be described. FIG. 25 shows the change in the detected flow rate relative to the air flow rate Q at the air flow sensor not equipped with a wall temperature sensor. When the wall temperature of the support member 233 is equal to the air temperature, the output of the sensor is constant relative to the change in the air flow rate Q as indicated by the straight line $M_O$. However, when the support member 233 is heated by the heat of the engine, for example, to 80° C. relative to the air temperature of 20° C., there arises a change in sensor output as the air flow rate Q decreases as indicated by the curve $M_1$, with the result that an error of about a maximum of 10% occurs. This is because when a temperature difference arises between the support member 233 and the hot wire 231, the temperature of the support member 233 is transmitted to the hot wire 231, so that the temperature of the hot wire is changed. The correction coefficient K is provided to offset the effect of the wall temperature. For example, the correction coefficient K is set as shown in FIG. 26. In FIG. 26, the ordinate represents the correction coefficient K, while one side of the abscissa represents the output value Tw of the wall temperature sensor 234 and the other side represents the driver output V ($\approx$ Qa) used as the air flow rate Qa. K forms a curved plane with Tw and V used as parameters.

Figure 27:
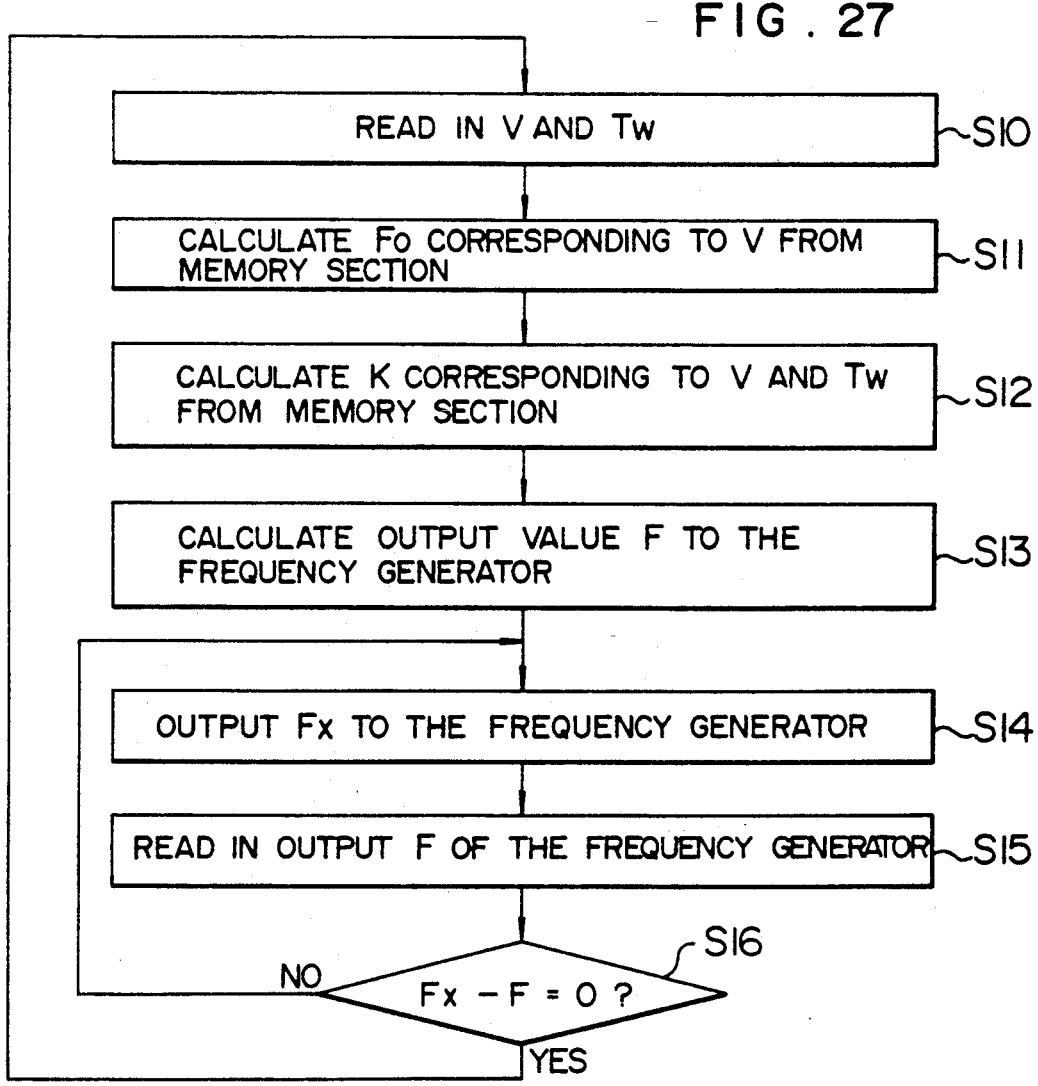
FIG. 27 is a flowchart for explaining the operation of the control section.

The operation of the control section 240 will be described with reference to FIG. 27. Output V of the driver 237 and output Tw of the wall temperature sensor 234 are read in (Step S10). Then, from the relation between the above-mentioned V and Fo stored in the first memory 238A of the memory section 238, the sensor output Fo corresponding to the output V of the driver 237 is obtained (step S11). At the same time, from the relation of FIG. 26 stored in the second memory 238B, correction coefficients K corresponding to the output Tw of the wall temperature sensor 234 and the driver output V (Step S12). Next, Fx=K×Fo is calculated, and the target value of sensor output Fx to be output to the frequency generator 239 is obtained (Step S13). Then, the target value Fx is output to the frequency generator 239 to drive the frequency generator 239 (Step S14), the output F of the frequency generator 239 is read in as a feedback value (Step S15), and a decision is made whether or not the deviation of the feedback value F from the target value Fx is zero (Step S16). The target value Fx continues to be output until the deviation becomes zero (Steps S14 to S16). By carrying out the above procedure, the frequency generator 239 is controlled by the control section 240 so that the electric signal F as sensor output agrees with the target value Fx.

Therefore, according to the present embodiment, from the relation stored in the first memory 238A, the sensor output Fo, which is in a fixed relation with the air flow rate Q, is obtained through the medium of the driver output V, and the effect of the wall temperature of the support member 233 is offset by using the output Tw of the wall temperature sensor 234. Therefore, it is possible to put the characteristics of the air flow rate Q and the sensor output F in a fixed relation with higher accuracy, thereby greatly improving the detection accuracy and enhancing the compatibility of the sensor.

If, instead of a frequency generator, a voltage generator is used for the output section 239, the same effect can be obtained. Like in the embodiment of FIG. 18, the output section 139 may be controlled by the control section 240 by open loop control without feedback control.

Yet another embodiment will be described with reference to FIGS. 28 to 32. This embodiment is made by adding a function of performing air temperature compensation with high accuracy to the above-mentioned embodiment of FIG. 24.

Figure 28:
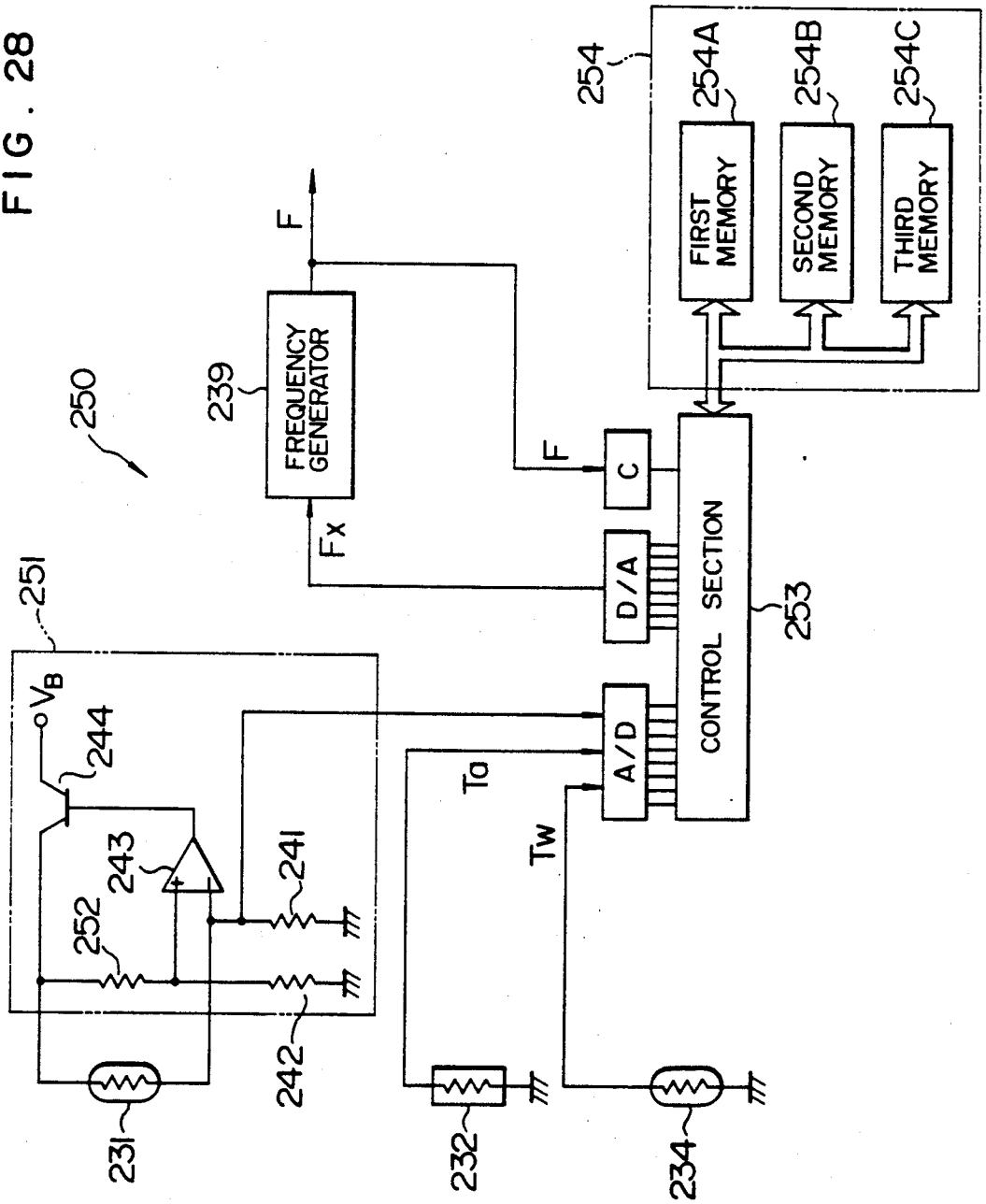
FIG. 28 is circuit arrangement of still another embodiment in which this invention is applied to an air flow sensor.

In FIG. 28, an air flow sensor 250 of this embodiment is composed without including the cold wire 232 in the bridge circuit of the driver 251, but by forming the bridge circuit by using the hot wire 231, the resistors 241 and 242, and a resistor 252, and by connecting the cold wire 232 independently to the control section. A memory section 254 comprises first, second and third memories 254A, 254B and 254C. The first memory 254A, like the memory section 214 of FIG. 18, has stored therein the relation of the output V of the driver 137 and the sensor output Fo. The second memory 254$b$ has stored therein a correction coefficient K1 for correcting the temperature characteristic of the hot wire 231 by the air temperature. The third memory 254 has stored therein a correction coefficient K2 for correcting the effect of the wall temperature Tw detected by the wall temperature sensor 234.

Figure 29:
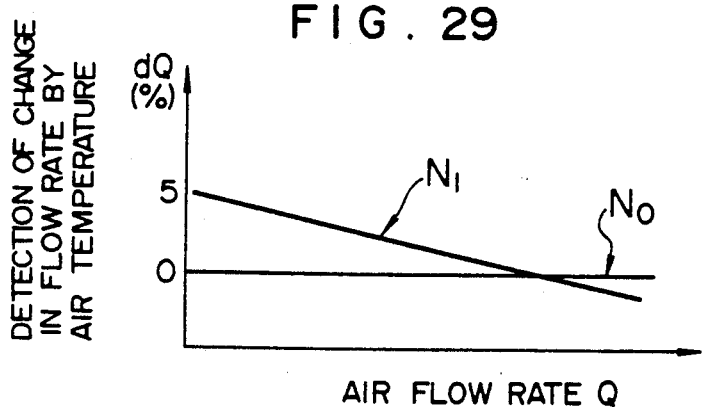
FIG. 29 is a temperature characteristic diagram showing the change in sensor output in relation to the air flow rate when the air temperature changes.
Figure 30:
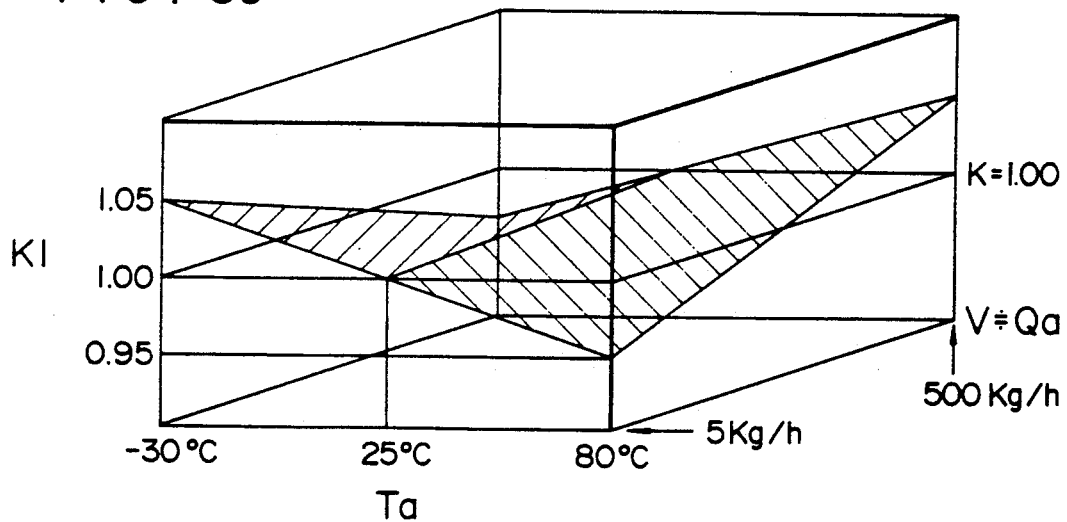
FIG. 30 is a diagram showing the setting contents of the correction factor K1, stored in the memory section.

The correction coefficients K1 and K2 will next be described. FIG. 29 shows the change of the detected flow rate dQ relative to the air flow rate Q in a case of correcting the temperature characteristic of the hot wire 231 by the air temperature by including the cold wire 232 in the bridge circuit of the driver as in the embodiment shown in FIG. 24. The sensor output relative to the change in the air flow rate Q is constant when the air temperature is 20° C. as indicated by the straight line $N_O$. However, when the air temperature is 80° C., the sensor output temperature changes with the change in the air flow rate Q as indicated by the curve N1. The correction coefficient K1 is used to correct the change in the temperature characteristic of the hot wire. As an example, FIG. 30 shows a case in which the correction coefficient K1 is set in the manner illustrated. In FIG. 30, the ordinate represents the correction coefficient K1, one side of the abscissa represents the output value Ta of the cold wire 232, and the other side represents the driver output ($\approx$Qa) used as the air flow rate Qa. K1 forms a curved plane with Ta and V used as parameters.

Figure 32:
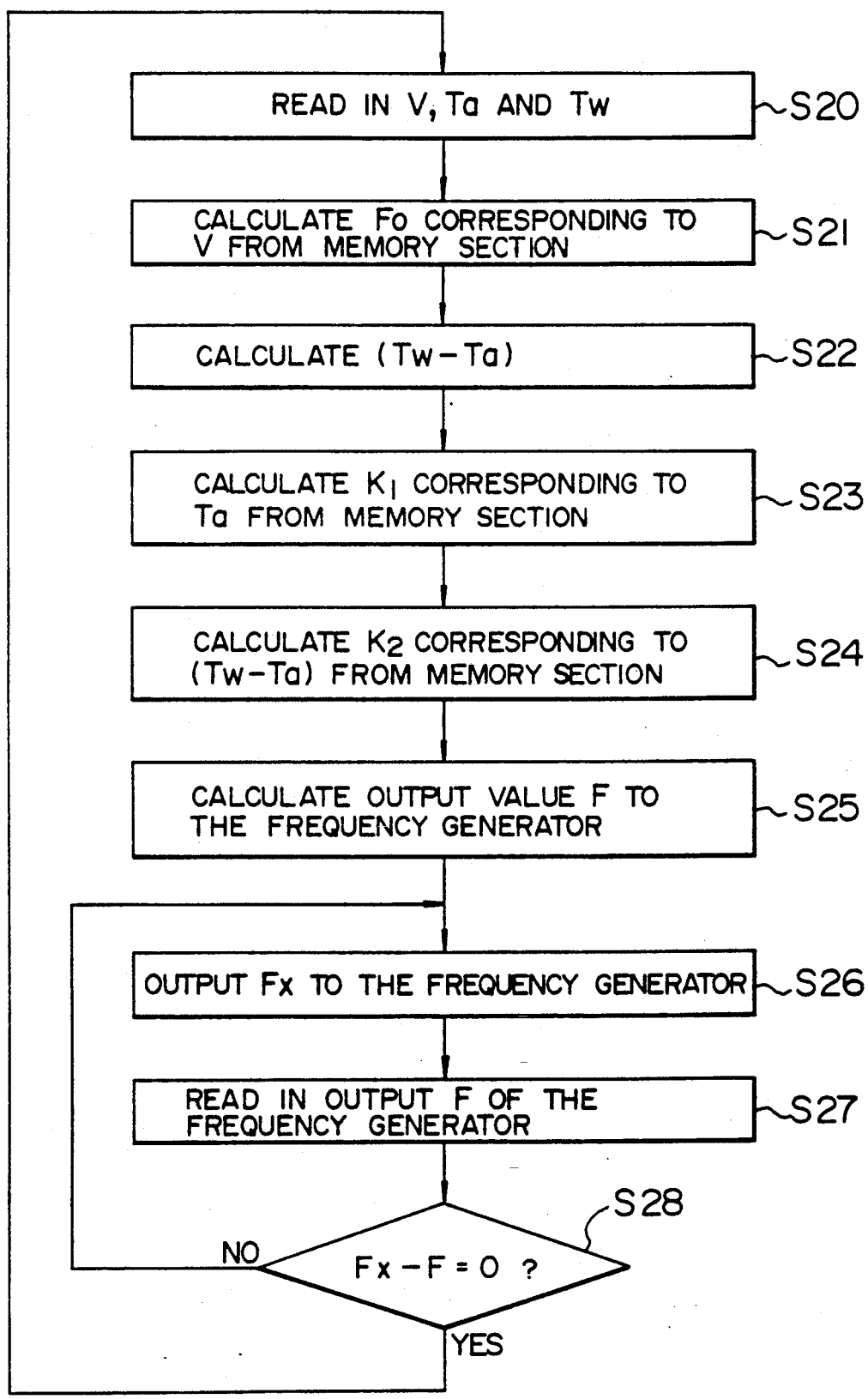
FIG. 32 is a flowchart for explaining the operation of the control section.
Figure 31:
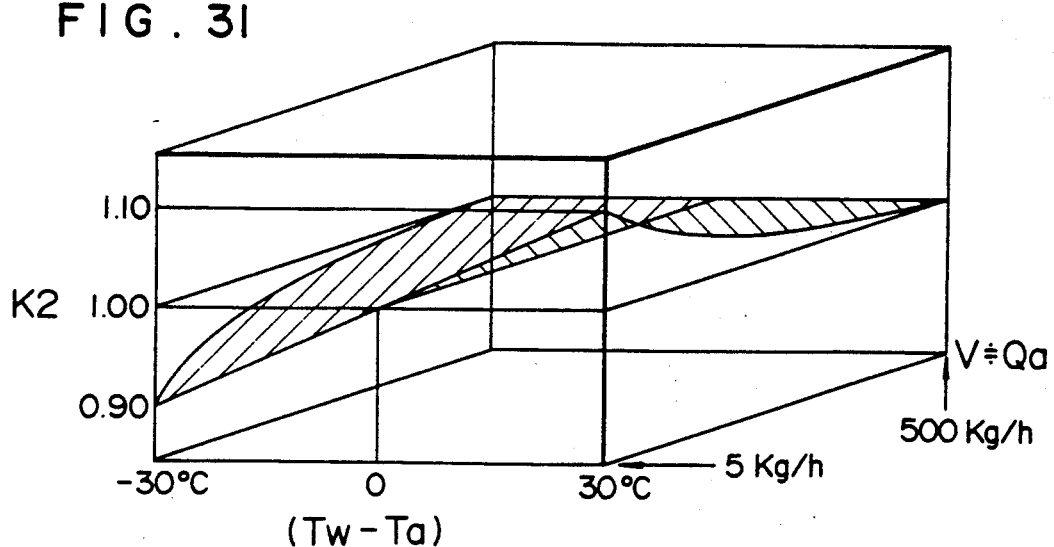
FIG. 31 is a diagram showing the setting contents of the correction factor K2, stored in the memory section.

The correction coefficient K2 has substantially the same meaning as the correction coefficient K which was described with regard to the embodiment shown in FIG. 24, and is used to correct the error of the sensor output that occurs when the temperature of the support member 233 (refer to FIG. 23) is transferred to the hot wire 231 and changes the temperature of the hot wire. In this embodiment, however, for the sake of accurate correction, the wall temperature Tw is not used directly, but a temperature difference between the wall temperature Tw and the air temperature Ta is used. As an example, FIG. 31 shows a case where the correction coefficient K2 is set in the manner illustrated. In FIG. 32, the shape of the curved plane of the correction coefficient K2 is then same as that of the K in FIG. 26. However, since the temperature difference between the wall temperature and the air temperature is used as a parameter of temperature, one side of the abscissa is Tw−Ta, accordingly.

The operation of the control section 253 will be described with reference to the flowchart of FIG. 32. First, the output V of the driver 251, the output Ta of the cold wire, and the output Tw of the wall temperature sensor 234 are read in (Step S20). Then, from the relation between earlier-mentioned V and Fo, stored in the first memory 258A of the memory section 254, the sensor output Fo corresponding to the output V of the driver 251 is obtained (Step S21). At the same time, from the output Tw of the wall temperature sensor 234 and the output Ta of the cold wire 232, a temperature difference between the wall temperature and the air temperature, Tw−Ta, is found (Step S22). From the relation of FIG. 30, stored in the second memory 254B, a correction coefficient K1 corresponding to the air temperature Ta and the driver output V is obtained (Step S23). From the relation of FIG. 31, stored in the third memory 254C, a correction coefficient K2 corresponding to the temperature difference Tw−Ta and the driver output V is obtained (Step S24).

Then, Fx=K1×K2×Fo is calculated, and the target value Fx of the sensor output to be supplied to the frequency generator 239 is obtained (Step S25). Thereafter, the frequency generator 239 is feedback-controlled in a closed loop so that the output F of the frequency generator 239 agrees with the target value Fx (Steps S26 to S28).

By this embodiment arranged as described, it is possible to reduce the dependence of the change in the hot wire's temperature characteristics on the flow rate, thereby further improving the detection accuracy and the compatibility of the sensor.

As has been described, by complying with the basic idea of this invention, it is possible to provide a compact-size, less expensive air flow measuring instrument which is less liable to malfunctioning even if noise enters in the wiring from the flow sensor u to the microcomputer which controls the internal combustion engine.

In applied examples of this invention, sensors with high detection accuracy can be obtained, and when sensors are used in a system, it is possible to use different sensors and sensors of different methods by regarding them as having the same characteristics. The resulting effects are that the system accuracy can be enhanced, and serviceability in the market can be improved.

We claim:

1. A thermal intake air measuring instrument comprising:
   first detecting means for detecting a physical quantity;

driver means coupled to said first detecting means for converting said physical quantity detected by said first detecting means into an electrical signal;

memory means for storing a relation between the output of said driver means and the output of the thermal type intake air flow measuring instrument;

output means for generating an electric signal to be sent out; and control means for calculating a target value of output of the terminal type intake air flow measuring instrument on the basis of said relation, and for controlling said output means so that said electric signal to be sent out agrees with said target value.

2. The measuring instrument according to claim 1, further comprising second detecting means for detecting an air temperature, wherein said control means corrects the target value of output of the thermal type intake air flow measuring instrument according to the air temperature detected.

3. The measuring instrument according to claim 1, further comprising third detecting means for detecting a temperature of a part where said first detecting means is installed, wherein said control means corrects the target value of output of the thermal type intake air flow measuring instrument.

4. The measuring instrument according to claim 1, wherein said memory means has stored therein the relation between the output of said driver means and the output of the thermal type intake air flow measuring instrument prior to the production of a thermal type intake air flow measuring instrument.

5. The measuring instrument according to claim 1, wherein said output means is a frequency generator.

6. The measuring instrument according to claim 1, wherein said output means is a voltage generator.

7. A method of measuring intake air by use of a thermal type intake air measuring instrument, said method comprising the steps of:
 (a) detecting a physical quantity;
 (b) converting said physical quantity into an electric signal;
 (c) storing, in a memory, a relationship between the physical quantity detected in step (a) and an output of said thermal type intake air measuring instrument;
 (d) generating an output electric signal to be sent out from an output unit;
 (e) calculating a target value of said output of said thermal type intake air measuring instrument on the basis of said relationship stored in said memory; and
 (f) controlling said output unit so that said output electric signal coincides with said target value.

* * * * *